United States Patent
Zhang et al.

(10) Patent No.: US 11,217,828 B2
(45) Date of Patent: Jan. 4, 2022

(54) FLAME-RETARDANT, NON-TOXIC PHOSPHATE ESTER IONIC LIQUID ELECTROLYTES AND METHOD OF MAKING

(71) Applicant: Massachusetts Institute of Technology, Cambridge, MA (US)

(72) Inventors: Shiyu Zhang, Cambridge, MA (US); Christopher C. Cummins, Dorchester, MA (US); Matthew Jordan Nava, Brighton, MA (US); Daniel Nocera, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 464 days.

(21) Appl. No.: 15/831,377

(22) Filed: Dec. 4, 2017

(65) Prior Publication Data
US 2018/0159181 A1 Jun. 7, 2018

Related U.S. Application Data

(60) Provisional application No. 62/430,342, filed on Dec. 5, 2016.

(51) Int. Cl.
| | | |
|---|---|---|
| *H01M 10/0567* | (2010.01) | |
| *H01M 10/0568* | (2010.01) | |
| *H01M 10/42* | (2006.01) | |
| *H01M 10/0525* | (2010.01) | |
| *C09K 21/12* | (2006.01) | |

(52) U.S. Cl.
CPC ......... *H01M 10/4235* (2013.01); *C09K 21/12* (2013.01); *H01M 10/0525* (2013.01); *H01M 10/0567* (2013.01); *H01M 10/0568* (2013.01)

(58) Field of Classification Search
None
See application file for complete search history.

(56) References Cited

U.S. PATENT DOCUMENTS

| | | | | |
|---|---|---|---|---|
| 4,384,121 A | * | 5/1983 | Meyer | C07D 221/14 252/301.27 |
| 5,830,600 A | * | 11/1998 | Narang | H01M 6/162 429/326 |
| 6,642,294 B1 | * | 11/2003 | Bauer | A01N 59/16 524/430 |
| 9,840,473 B1 | * | 12/2017 | Wang | C07D 233/56 |
| 2006/0264645 A1 | * | 11/2006 | Zhou | C07D 233/56 548/335.1 |
| 2011/0251301 A1 | * | 10/2011 | Bos | C08G 18/3206 523/106 |

* cited by examiner

*Primary Examiner* — Tracy M Dove
(74) *Attorney, Agent, or Firm* — Honigman LLP

(57) ABSTRACT

A phosphate ester compound can include a cation and an anion, the anion being an alkyl phosphate. The phosphate ester compound can be a phosphate ester ionic liquid. The phosphate ester compound can be manufactured in a solvent-free environment. The phosphate ester compound can be used as an electrolyte in a battery, for example, a lithium-ion battery.

14 Claims, 35 Drawing Sheets phosophate triester phosophate triester              Ionic Liquid

Synthesis and characterization of 1-(2-methoxyethyl)-1-methylpyrrolidinium) bis(2-methoxyethyl)phosphate [PYR$_1$ME][O$_2$P(OME)$_2$] (1)

Synthesis and characterization of 1-(2-(2-methoxyethoxy)ethoxy)-1-methylpyrrolidinium) bis(2-(2-methoxyethoxy)ethyl)phosphate [PYR$_1$(MEE)$_2$][O$_2$P(OMEE)$_2$] 2

M = Li, Na, K, Rb, Cs, Mg, Ca, Sr, Ba $R_1, R_2, R_3, R_4, R_5, R_6$ = alkyl, aryl or

FLAME-RETARDANT, NON-TOXIC PHOSPHATE ESTER IONIC LIQUID ELECTROLYTES AND METHOD OF MAKING

PRIORITY CLAIM

The application claims priority to U.S. Provisional Application No. 62/430,342, filed Dec. 5, 2016, which is incorporated by reference in its entirety.

FIELD OF THE INVENTION

The invention relates to ionic liquid materials and methods of making.

BACKGROUND

Lithium-ion batteries have attracted considerable attention as one of the most promising electrical energy storage (EES) systems. This class of batteries is currently the cornerstone of the modern portable electronics industry and are at the forefront of potential technologies to replace gasoline in vehicles and reduce society's dependence on fossil fuels. The organic liquid electrolytes employed by commercial Lithium-ion batteries, however, pose significant technical challenges for the successful implementation and continued development of this technology in demanding applications, particularly electric vehicles. Conventional carbonate-based solvent (in both liquid and vapor form) can be readily ignited by internal/external short circuits, resulting in the possibility of explosive accidents, which, in selected cases, have resulted in considerable property damage and injuries to individuals. See, for example, Mikolajczak, C., Kahn, M., Kevin White & Long, R. T. *Lithium-Ion Batteries Hazard and Use Assessment. Natl. Fire Prot. Assoc.* (2011), which is incorporated by reference in its entirety. Room-temperature Ionic liquids (IL) have been identified as desirable alternatives to organic-solvent-based electrolytes, due to their wide electrochemical stability window, high ionic conductivity, negligible vapor pressure (resulting in poor flammability), and high thermal stability.

SUMMARY

In general, a compound can be an ionic compound including a phosphate ester. The ionic compound can be an ionic liquid. The compound can have the formula $$AB_x$$

wherein A is $M^+$, $NR_1R_2R_3R_4^+$, $PR_1R_2R_3R_4^+$, imidazolium-$R_1R_2^+$, pyridinium-$R_1^+$ or $SR_1R_2R_3^+$, wherein $R_1$ is alkyl, aryl, $-(CH_2CH_2O)_nR_a$ or $-(CF_2CF_2O)_nR_a$, $R_2$ is alkyl, aryl, $-(CH_2CH_2O)_nR_a$ or $-(CF_2CF_2O)_nR_a$, $R_3$ is alkyl, aryl, $-(CH_2CH_2O)_nR_a$ or $-(CF_2CF_2O)_nR_a$, or $R_2$ and $R_3$ together form a C2-C8 ring, and $R_4$ is absent, alkyl, aryl, $-(CH_2CH_2O)_nR_a$ or $-(CF_2CF_2O)_nR_a$, and $M^+$ is $Li^+$, $Na^+$, $K^+$, $Rb^+$, $Cs^+$, $Mg^{+2}$, $Ca^{+2}$, $Sr^{+3}$, or $Ba^{+2}$, and B is $P(O)_2(OR_5)(OR_6)^-$, wherein each of $R_5$ and $R_6$, independently, is $-(CH_2CH_2O)_nR_a$ or $-(CF_2CF_2O)_nR_a$, wherein each n, independently, is 0-100, x is 1, 2 or 3, and each $R_a$, independently, is H or C1-C14 alkyl.

In certain circumstances, the compound can be a compound in which x is 1 and A is $M^+$, $NR_1R_2R_3R_4^+$, $PR_1R_2R_3R_4^+$, imidazolium-$R_1R_2^+$, pyridinium-$R_1^+$ or $SR_1R_2R_3^+$, wherein $M^+$ is $Li^+$, $Na^+$, $K^+$, $Rb^+$, or $Cs^+$. In certain circumstances, A can be $NR_1R_2R_3R_4^+$. In other circumstances, A can be $PR_1R_2R_3R_4^+$. In other circumstances, A can be $SR_1R_2R_3^+$. In other circumstances, A can be $Li^+$.

In certain circumstances, the compound can be a compound in which each n, independently, can be 1, 2, 3, 4, 5, or 6.

In certain circumstances, A can be $NR_1R_2R_3R_4^+$, wherein $R_1$ is C1-C6 alkyl, $-(CH_2CH_2O)_nR_a$ or $-(CF_2CF_2O)_nR_a$, each n, independently, is 1, 2, 3, 4, or 5 and $R_a$ is H or C1-C6 alkyl, $R_2$ is C1-C18 alkyl, C6-C14 aryl or $R_2$ and $R_3$ together form a C2-C8 ring, and $R_4$ is absent, C1-C6 alkyl, C1-C6 aryl, $-(CH_2CH_2O)_nR_a$ or $-(CF_2CF_2O)_nR_a$, each n, independently, is 1, 2, 3, 4, or 5 and each $R_a$ independently, is H or C1-C6 alkyl.

In certain circumstances, each of $R_5$ and $R_6$, independently, can be $-(CH_2CH_2O)_nR_a$, wherein each n, independently, is 1, 2 or 3, and each $R_a$, independently, is C1-C6 alkyl.

In certain circumstances, each of $R_5$ and $R_6$, independently, can be $-(CF_2CF_2O)_nR_a$, wherein each n, independently, is 1, 2 or 3, and each $R_a$, independently, is H or C1-C6 alkyl.

In certain circumstances, A can be $NR_1R_2R_3R_4^+$, wherein $R_1$ is C1-C6 alkyl, $-(CH_2CH_2O)_nR_a$ or $-(CF_2CF_2O)_nR_a$, each n, independently, is 1, 2, 3, 4, or 5 and $R_a$ is H or C1-C6 alkyl, $R_2$ is C1-C18 alkyl, C6-C14 aryl or $R_2$ and $R_3$ together form a C2-C8 ring, and $R_4$ is absent, C1-C6 alkyl, C1-C6 aryl, $-(CH_2CH_2O)_nR_a$ or $-(CF_2CF_2O)_nR_a$, each n, independently, is 1, 2, 3, 4, or 5 and each $R_a$, independently, is H or C1-C6 alkyl, and B is $P(O)_2(OR_5)(OR_6)^-$, each of $R_5$ and $R_6$, independently, is $-(CH_2CH_2O)_nR_a$, wherein each n, independently, is 1, 2 or 3, and each $R_a$, independently, is H or C1-C6 alkyl.

In certain circumstances, A can be $NR_1R_2R_3R_4^+$, wherein $R_1$ is C1-C6 alkyl, $-(CH_2CH_2O)_nR_a$ or $-(CF_2CF_2O)_nR_a$, each n, independently, is 1, 2, 3, 4, or 5 and $R_a$ is H or C1-C6 alkyl, $R_2$ is C1-C18 alkyl, C6-C14 aryl or $R_2$ and $R_3$ together form a C2-C8 ring, and $R_4$ is absent, C1-C6 alkyl, C1-C6 aryl, $-(CH_2CH_2O)_nR_a$ or $-(CF_2CF_2O)_nR_a$, each n, independently, is 1, 2, 3, 4, or 5 and each $R_a$, independently, is H or C1-C6 alkyl, and B is $P(O)_2(OR_5)(OR_6)^-$, each of $R_5$ and $R_6$, independently, is $-(CH_2CH_2O)_nR_a$, wherein each n, independently, is 1 or 2, and $R_a$ is H, methyl or trifluoromethyl.

In certain circumstances, A can be $Li^+$,
and
B is $P(O)_2(OR_5)(OR_6)^-$,
each of $R_5$ and $R_6$, independently, is $-(CH_2CH_2O)_nR_a$,
wherein
each n, independently, is 1, 2 or 3, and
each $R_a$, independently, is H or C1-C6 alkyl.

In another aspect, a method of preparing an ionic compound can include contacting a first nucleophile with a trialkoxyphosphine oxide to form the ionic compound. The ionic compound can be the compound described above.

In certain circumstances, the first nucleophile can be $NR_2R_3R_4$, $PR_2R_3R_4$, imidazole-$R_1$, pyridine or $SR_2R_3^+$, wherein $R_1$ is alkyl, aryl, $-(CH_2CH_2O)_nR_a$ or $-(CF_2CF_2O)_nR_a$, $R_2$ is alkyl, aryl, $-(CH_2CH_2O)_nR_a$ or $-(CF_2CF_2O)_nR_a$, $R_3$ is alkyl, aryl, $-(CH_2CH_2O)_nR_a$ or $-(CF_2CF_2O)_nR_a$, or $R_2$ and $R_3$ together form a C2-C8 ring, and $R_4$ is absent, alkyl, aryl, $-(CH_2CH_2O)_nR_a$ or $-(CF_2CF_2O)_nR_a$, and the trialkoxyphosphine oxide is $P(O)(OR_1)(OR_5)(OR_6)^-$, wherein $R_1$ is alkyl, aryl, $-(CH_2CH_2O)_nR_a$ or —$(CF_2CF_2O)_nR_a$ and each of $R_5$ and $R_6$, independently, is —$(CH_2CH_2O)_nR_a$ or —$(CF_2CF_2O)_nR_a$, wherein each n, independently, is 0-100, each x, independently, is 1, 2 or 3, and each $R_a$, independently, is H or C1-C14 alkyl.

In certain circumstances, the method can be a solvent free method.

In another aspect, a battery can include a housing having an anode and a cathode and an electrolyte, the electrolyte including a compound described above. The battery can be a lithium-ion battery.

In another aspect, a compound can have the formula

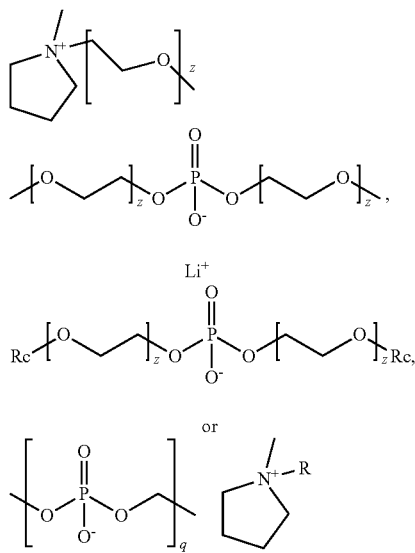

wherein z is 1, 2, 3, or 4 and q is an integer less than 100, and R is alkyl, aryl, —$(CH_2CH_2O)_nR_a$ or —$(CF_2CF_2O)_nR_a$, n is 1, 2, 3 or 4, and each of $R_a$ and $R_c$, independently, is C1-C6 alkyl.

For example, the compound can be

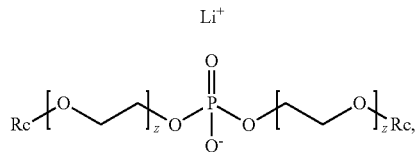

in which z is 1, 2 or 3 and $R_c$ is methyl or butyl.

Other aspects, embodiments, and features will be apparent from the following description, the drawings, and the claims.

BRIEF DESCRIPTION OF THE DRAWINGS

FIG. 5B is a plot of lithium-ion transference number vs. salt concentration. FIG. 5C is a plot of lithium-ion transference number vs. molecular weight of the anion employed in the electrolyte.

DETAILED DESCRIPTION

Figure 1:
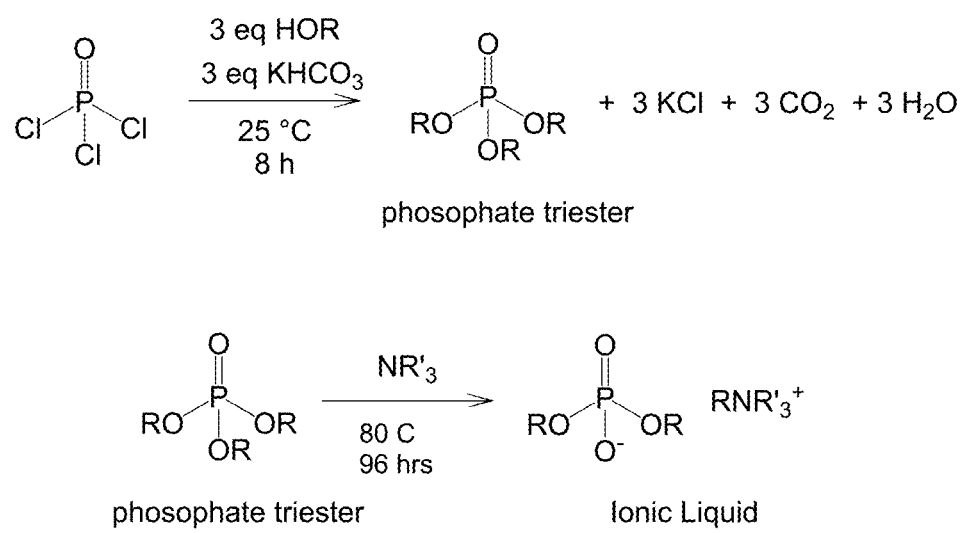
FIG. 1 is a scheme depicting a synthesis strategy for a class of phosphate diester ionic compounds.

Traditional ionic liquids (IL) consisting of nitrogen-based cations (pyridinium, imidazolium, and tetraalkylammonium), and bis(trifluoromethane)sulfonimide (TFSI) anion, suffer from numerous drawbacks such as high production cost, tedious purification procedures and slow Li-ion transfer kinetics, which has prevented widescale adoption of this class of electrolytes in Lithium-ion batteries. In particular, the sluggish Lithium-ion diffusion and electrolyte/electrode interfacial transfer of common TFSI ionic liquids are caused by the strong electrostatic interaction between a lithium ion with TFSI. See, for example, Liu, H. & Maginn, E. Effect of ion structure on conductivity in lithium-doped ionic liquid electrolytes: A molecular dynamics study. *J. Chem. Phys.* 139, 1-11 (2013), Shimizu, M., Usui, H. & Sakaguchi, H. Functional ionic liquids for enhancement of Li-ion transfer: the effect of cation structure on the electrode. *Phys. Chem. Chem. Phys.* 18, 5139-5147 (2015), Lesch, V. et al. A Combined Theoretical and Experimental Study of the Influence of Different Anion Ratios on Lithium Ion Dynamics in Ionic Liquids. *J. Phys. Chem. B* 8, 7367-7375 (2014), Castiglione, F. et al. Pyrrolidinium-based ionic liquids doped with lithium salts: How does Li+ coordination affect its diffusivity? *J. Phys. Chem. B* 118, 13679-13688 (2014), and Castiglione, F. et al. Molecular environment and enhanced diffusivity of Li+ ions in lithium-salt-doped ionic liquid electrolytes. *J. Phys. Chem. Lett.* 2, 153-157 (2011), which is incorporated by reference in its entirety. While most research on IL electrolytes focus on tuning and modulating the structure of the cation, the effect of anion on cell performance remains unexplored. See, for example, Shimizu, M., Usui, H. & Sakaguchi, H. Functional ionic liquids for enhancement of Li-ion transfer: the effect of cation structure on the electrode. *Phys. Chem. Chem. Phys.* 18, 5139-5147 (2015) and Martins, V. L., Sanchez-Ramirez, N., Ribeiro, M. C. C. & Torresi, R. M. Two phosphonium ionic liquids have high Li$^+$ transport number. *Phys. Chem. Chem. Phys.* 17, 23041-23051 (2015), which is incorporated by reference in its entirety.

The discovery of electrochemically active material, lithium iron phosphate (LiFePO$_4$), has led to extensive research efforts focusing on the development of transition metal phosphates as electrode materials in lithium-ion batteries. See, for example, Padhi, A. K., Nanjundaswamy, K. S., Masquelier, C., Okada, S. & Goodenough, J. B. Effect of structure on the Fe3+/Fe2+ redox couple in iron phosphates. *J. Electrochem. Soc.* 144, 1609-1613 (1997), which is incorporated by reference in its entirety. The resistance of phosphate towards electrochemical reduction and oxidation, coupled with its negligible cost and low toxicity make them promising building blocks for cell components. For example, solid state phosphate conductors, such as NASICON and LIPON, display excellent high-voltage stability and high room temperature ion conductivity. See, for example, Wang, Y. et al. Design principles for solid-state lithium superionic conductors. *Nat Mater* 14, 1-23 (2015), which is incorporated by reference in its entirety. In contrast to the successful development and application of solid-state phosphate materials in EES, the application of ionic liquids composed of phosphate (diester) as electrolytes in Lithium-ion cells has only been sparsely explored. See, for example, Kumar, H. & Chadha, C. Interionic Interactions of Aqueous Mixtures of Ionic Liquid 1-Hexyl-3-methylimidazolium Chloride with Phosphate Salts at T=(288.15 to 308.15) K: Volumetric, Acoustic and UV Absorption Studies. *J. Chem. Eng. Data* 60, 2937-2950 (2015), Chen, X. et al. Isobaric vapor-liquid equilibrium for acetone+methanol+phosphate ionic liquids. *J. Chem. Eng. Data* 60, 612-620 (2015), Pan, J., Yang, G. & Chen, D. Imidazoline trialkyl phosphate salt compound, its preparation method, ionic salt solution and preparation method thereof. *Faming Zhuanli Shenqing* 23pp. (2015), which is incorporated by reference in its entirety.

A new class of safe electrolytes based on phosphate diester anion was synthesized, and its performance in symmetrical Li/Li cells was evaluated. High Li transference numbers and moderate ion conductivity can be achieved through synthetically modification of the electrolyte structure. This new class of electrolytes is flame-retarding, as it undergoes thermolysis to form protective charr and phosphate glass layers upon exposure to extreme temperatures.

A phosphate diester ionic compound can be used as flame-retardant, non-toxic, biodegradable electrolytes for lithium-ion batteries. The ionic compound can be prepared using low cost starting materials in easily scalable procedures which can be conducive to large scale adoption by industry.

The compound can have the formula $$AB_x$$

wherein A is $M^+$, $NR_1R_2R_3R_4^+$, $PR_1R_2R_3R_4^+$, imidazolium-$R_1R_2^+$, pyridinium-$R_1^+$ or $SR_1R_2R_3^+$, wherein $R_1$ is alkyl, aryl, —$(CH_2CH_2O)_nR_a$ or —$(CF_2CF_2O)_nR_a$, $R_2$ is alkyl, aryl, —$(CH_2CH_2O)_nR_a$ or —$(CF_2CF_2O)_nR_a$, $R_3$ is alkyl, aryl, —$(CH_2CH_2O)_nR_a$ or —$(CF_2CF_2O)_nR_a$, or $R_2$ and $R_3$ together form a C2-C8 ring, and $R_4$ is absent, alkyl, aryl, —$(CH_2CH_2O)_nR_a$ or —$(CF_2CF_2O)_nR_a$, and $M^+$ is $Li^+$, $Na^+$, $K^+$, $Rb^+$, $Cs^+$, $Mg^{+2}$, $Ca^{+2}$, $Sr^{+3}$, or $Ba^{+2}$, and B is $P(O)_2(OR_5)(OR_6)^-$, wherein each of $R_5$ and $R_6$, independently, is —$(CH_2CH_2O)_nR_a$ or —$(CF_2CF_2O)_nR_a$, wherein each n, independently, is 0-100, x is 1, 2 or 3, and
each $R_a$, independently, is H or C1-C14 alkyl.

In certain circumstances, the compound can be a compound in which x is 1 and A is M+, $NR_1R_2R_3R_4^+$, $PR_1R_2R_3R_4^+$, imidazolium-$R_1R_2^+$, pyridinium-$R_1^+$ or $SR_1R_2R_3^+$, wherein $M^+$ is $Li^+$, $Na^+$, $K^+$, $Rb^+$, or $Cs^+$. In certain circumstances, A can be $NR_1R_2R_3R_4^+$. In other circumstances, A can be $PR_1R_2R_3R_4^+$. In other circumstances, A can be $SR_1R_2R_3^+$.

In certain circumstances, the compound can be a compound in which each n, independently, can be 1, 2, 3, 4, 5, or 6.

In certain circumstances, A can be $NR_1R_2R_3R_4^+$, wherein $R_1$ is C1-C6 alkyl, —$(CH_2CH_2O)_nR_a$ or —$(CF_2CF_2O)_nR_a$, each n, independently, is 1, 2, 3, 4, or 5 and $R_a$ is H or C1-C6 alkyl, $R_2$ is C1-C18 alkyl, C6-C14 aryl or $R_2$ and $R_3$ together form a C2-C8 ring, and $R_4$ is absent, C1-C6 alkyl, C1-C6 aryl, —$(CH_2CH_2O)_nR_a$ or —$(CF_2CF_2O)_nR_a$, each n, independently, is 1, 2, 3, 4, or 5 and each $R_a$ independently, is H or C1-C6 alkyl.

In certain circumstances, each of $R_5$ and $R_6$, independently, can be —$(CH_2CH_2O)_nR_a$, wherein each n, independently, is 1, 2 or 3, and each $R_a$, independently, is C1-C6 alkyl.

In certain circumstances, each of $R_5$ and $R_6$, independently, can be —$(CF_2CF_2O)_nR_a$, wherein each n, independently, is 1, 2 or 3, and each $R_a$, independently, is H or C1-C6 alkyl.

In certain circumstances, A can be $NR_1R_2R_3R_4^+$, wherein $R_1$ is C1-C6 alkyl, —$(CH_2CH_2O)_nR_a$ or —$(CF_2CF_2O)_nR_a$, each n, independently, is 1, 2, 3, 4, or 5 and $R_a$ is H or C1-C6 alkyl, $R_2$ is C1-C18 alkyl, C6-C14 aryl or $R_2$ and $R_3$ together form a C2-C8 ring, and $R_4$ is absent, C1-C6 alkyl, C1-C6 aryl, —$(CH_2CH_2O)_nR_a$ or —$(CF_2CF_2O)_nR_a$, each n, independently, is 1, 2, 3, 4, or 5 and each $R_a$, independently, is H or C1-C6 alkyl, and B is $P(O)_2(OR_5)(OR_6)^-$, each of $R_5$ and $R_6$, independently, is —$(CH_2CH_2O)_nR_a$, wherein each n, independently, is 1, 2 or 3, and each $R_a$, independently, is H or C1-C6 alkyl.

In certain circumstances, A can be $NR_1R_2R_3R_4^+$, wherein $R_1$ is C1-C6 alkyl, —$(CH_2CH_2O)_nR_a$ or —$(CF_2CF_2O)_nR_a$, each n, independently, is 1, 2, 3, 4, or 5 and $R_a$ is H or C1-C6 alkyl, $R_2$ is C1-C18 alkyl, C6-C14 aryl or $R_2$ and $R_3$ together form a C2-C8 ring, and $R_4$ is absent, C1-C6 alkyl, C1-C6 aryl, —$(CH_2CH_2O)_nR_a$ or —$(CF_2CF_2O)_nR_a$, each n, independently, is 1, 2, 3, 4, or 5 and each $R_a$, independently, is H or C1-C6 alkyl, and B is $P(O)_2(OR_5)(OR_6)^-$, each of $R_5$ and $R_6$, independently, is —$(CH_2CH_2O)_nR_a$, wherein each n, independently, is 1 or 2, and $R_a$ is H, methyl or trifluoromethyl.

In certain circumstances, A can be $Li^+$,
and
B is $P(O)_2(OR_5)(OR_6)^-$,
each of $R_5$ and $R_6$, independently, is —$(CH_2CH_2O)_nR_a$, wherein
each n, independently, is 1, 2 or 3, and
each $R_a$, independently, is H or C1-C6 alkyl.

In another aspect, a compound can have the formula

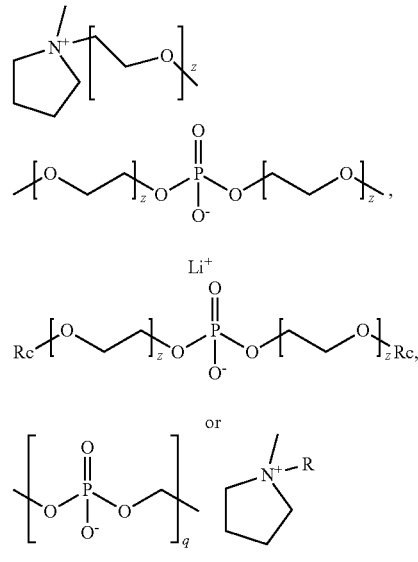

wherein z is 1, 2, 3, or 4 and q is an integer less than 100, R is alkyl, aryl, —$(CH_2CH_2O)_nR_a$ or —$(CF_2CF_2O)_nR_a$, n is 1, 2, 3 or 4, and each of $R_a$ and $R_c$, independently, is C1-C6 alkyl.

Alkyl is a straight or branched carbon chain containing 1 to 18 (preferably, 1 to 10; 1 to 6; more preferably 1 to 4) carbon atoms. The carbon chain can be saturated or unsaturated, for example, alkynyl or alkenyl. The carbon chain can be cyclic. The carbon chain can be halogenated, for example, partially fluorinated or fully fluorinated. The alkyl can be optionally substituted with alkyl, alkenyl, alkynyl, alkoxy, hydroxyl, hydroxylalkyl, halo, haloalkyl, amino, thio, alkylthio, arylthio, aralkylthio, acylthio, alkylcarbonyloxy, alkyloxycarbonyl, alkylcarbonyl, alkylsulfonylamino, aminosulfonyl, or alkylsulfonyl. The alkyl can be optionally interrupted by —O—, —S—, —$N(R^x)$—, —C(O)—, —$N(R^x)$—$SO_2$—, —$SO_2$—$N(R^x)$—, —$N(R^x)$—C(O)—O—, —O—C(O)—$N(R^x)$—, —$N(R^x)$—C(O)—$N(R^y)$—, —O—C(O)—, —C(O)—O—, —O—$SO_2$—, —$SO_2$—O—, or —O—C(O)—O—. Each of $R^x$ and $R^y$, independently, can be hydrogen, alkyl, alkenyl, alkynyl, alkoxy, hydroxylalkyl, hydroxyl, or haloalkyl. Each of the saturated and the unsaturated branched hydrocarbon chain can be optionally substituted with alkyl, alkenyl, alkynyl, alkoxy, hydroxyl, hydroxylalkyl, halo, haloalkyl, amino, thio, alkylthio, arylthio, aralkylthio, acylthio, alkylcarbonyloxy, alkyloxycarbonyl, alkylcarbonyl, alkylsulfonylamino, aminosulfonyl, or alkylsulfony Examples of alkyl include, but are not limited to, methyl, ethyl, propyl, isopropyl, butyl, isobutyl, sec-butyl, tert-butyl, n-pentyl, 2-methylhexyl, and 3-ethyloctyl. Alkenyl and alkynyl refer to a straight or branched hydrocarbon chain containing 2 to 10 carbon atoms and one or more (preferably, 1-4 or more preferably 1-2) double or triple bonds, respectively. Some examples of alkenyl and alkynyl are allyl, 2-butenyl, 2-pentenyl, 2-hexenyl, 2-butynyl, 2-pentynyl, and 2-hexynyl.

When the alkyl is cyclic, the alkyl can be a monocyclic, bicyclic or tricyclic alkyl group containing 3 to 14 carbon atoms. Some examples of cycloalkyl are cyclopropyl, cyclopentyl, cyclohexyl, cycloheptyl, adamantyl, and norbornyl. Heterocycloalkyl is a cycloalkyl group containing at least one heteroatom (e.g., 1-3) such as nitrogen, oxygen, or sulfur. The nitrogen or sulfur may optionally be oxidized and the nitrogen may optionally be quaternized. Examples of heterocycloalkyl include piperidinyl, piperazinyl, tetrahydropyranyl, tetrahydrofuryl, and morpholinyl. Cycloalkenyl is a cycloalkyl group containing at least one (e.g., 1-3) double bond. Examples of such a group include cyclopentenyl, 1,4-cyclohexa-di-enyl, cycloheptenyl, and cyclooctenyl groups. By the same token, heterocycloalkenyl is a cycloalkenyl group containing at least one heteroatom selected from the group of oxygen, nitrogen or sulfur.

Aryl is an aromatic group containing a 5-14 member ring and can contain fused rings, which may be saturated, unsaturated, or aromatic. The aryl can be carbocyclic or heterocyclic. Examples of an aryl group include phenyl, naphthyl, biphenyl, phenanthryl, and anthracyl. If the aryl is specified as "monocyclic aryl," if refers to an aromatic group containing only a single ring, i.e., not a fused ring.

A heterocyclic aryl is aryl containing at least one (e.g., 1-3) heteroatom such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl.

The cyclic moiety can be a fused ring formed from two or more of the just-mentioned groups. Examples of a cyclic moiety having fused rings include fluorenyl, dihydro-dibenzoazepine, dibenzocycloheptenyl, 7H-pyrazino[2,3-c]carbazole, or 9,10-dihydro-9,10-[2]buteno-anthracene.

In general, the ionic compound described herein can have a cation that can be any number of cationic species, for example, a group IA metal ion. The following lists possible cations.

| Nitrogen-Based Cations | |
|---|---|
| 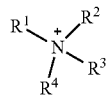 | $R^1$ to $R^4$ are independently hydrogen; or straight or branched, saturated or unsaturated, alkyl containing 1 to 60 carbon atoms and optionally containing a linkage of the formula —O—, —S—, —NH—, —C(O)—, —C(O)O—, —OC(O)—, —C(O)NH— or —NHC(O)—, and optionally substituted with —CN, —Cl, —Br, —F, aryl, aryloxy, heterocyclic, or cyclo-$C_3$–$C_8$-alkyl; or $R^1$ to $R^4$ are independently selected from the group consisting of bicyclic, tricyclic and polycyclic alkyl, cyclo-$C_3$–$C_8$-alkyl, aryl, and heterocyclic, any of which is optionally substituted with —CN, —Cl, —Br, —F, or with phenyl, benzyl, or straight or branched, saturated or unsaturated, alkyl or alkoxy containing up to 12 carbon atoms, the optional phenyl, benzyl, alkyl and alkoxy substituents being optionally substituted with —CN, —Cl, —Br, —F, or $C_1$–$C_6$ alkyl |
| 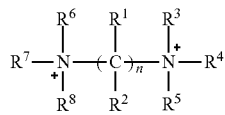 | $R^1$ to $R^8$ are the same as the R claimed in entry 1. n > 0 |
| 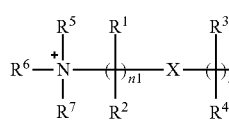 | $R^1$ to $R^{10}$ are the same as the R claimed in entry 1. n1, n2 > 0 X = O, S, NR (R = H, alkyl, aryl) |
| 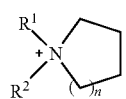 | $R^1$ to $R^2$ are the same as the R claimed in entry 1. n > 0 |
| 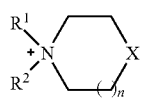 | $R^1$ to $R^2$ are the same as the R claimed in entry 1. n > 0 X = O, S, $CH_2$ |
| 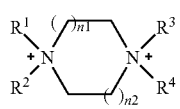 | $R^1$ to $R^4$ are the same as the R claimed in entry 1. n1, n2 > 0 |

-continued

| Nitrogen-Based Cations | |
|---|---|
| 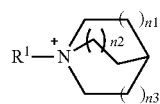 | $R^1$ is the same as the R claimed in entry 1.<br>n1, n2, n3 > 0 |
| 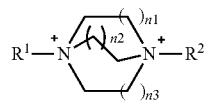 | $R^1$ to $R^2$ are the same as the R claimed in entry 1.<br>n1, n2, n3 > 0 |
| 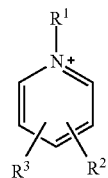 | $R^1$ to $R^3$ are the same as the R claimed in entry 1. |
| 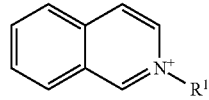 | $R^1$ is the same as the R claimed in entry 1. |
| 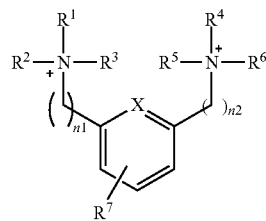 | $R^1$ to $R^7$ are the same as the R claimed in entry 1.<br>X = C, N<br>n1, n2 ≥ 0 |
| 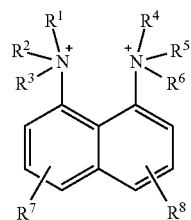 | $R^1$ to $R^8$ are the same as the R claimed in entry 1. |
| 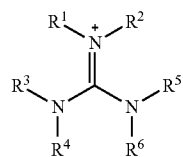 | $R^1$ to $R^6$ are the same as the R claimed in entry 1. |
| 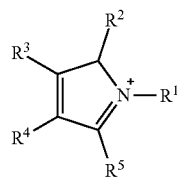 | $R^1$ to $R^5$ are the same as the R claimed in entry 1. |
| 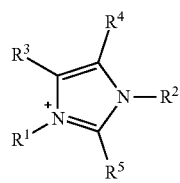 | $R^1$ to $R^5$ are the same as the R claimed in entry 1. |

-continued

| Nitrogen-Based Cations | |
|---|---|
| 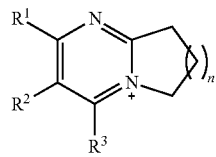 | $R^1$ to $R^3$ are the same as the R claimed in entry 1.<br>n > 0 |
| 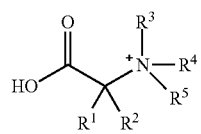 | $R^1$ to $R^5$ are the same as the R claimed in entry 1. |

| Phosphorus-Based Cations | |
|---|---|
| 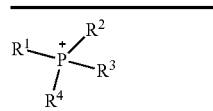 | $R^1$ to $R^4$ are the same as the R claimed in entry 1. |
| 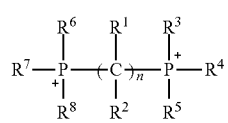 | $R^1$ to $R^8$ are the same as the R claimed in entry 1.<br>n > 0 |
| 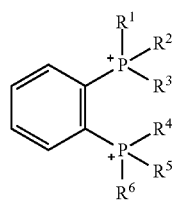 | $R^1$ to $R^6$ are the same as the R claimed in entry 1. |
| 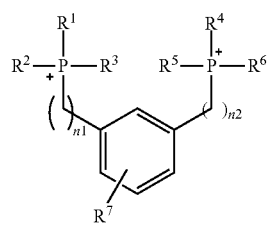 | $R^1$ to $R^7$ are the same as the R claimed in entry 1.<br>n1, n2 > 0 |
| 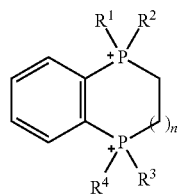 | $R^1$ to $R^4$ are the same as the R claimed in entry 1.<br>n > 0 |
| 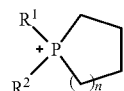 | $R^1$ to $R^2$ are the same as the R claimed in entry 1.<br>n > 0 |

Alkali and Alkali-Earth Metal Cations
Na(15-crown-5)
Na(benzo-15-crown-5)
K(18-crown-6)
K(benzo-18-crown-6)
K(dibenzo-18-crown-6)
K(dicyclohexyl-18-crown-6)
K(kryptofix 222)
K(diaza-18-crown-6)
Li(12-crown-4)
Ca(kryptofix 221)
Ionic Liquid Cations
1,1-dimethyl-pyrrolidinium
1,1-dimethyl-pyrrolidinium
1-butyl-1-ethyl-pyrrolidinium
1-butyl-1-methyl-pyrrolidinium
1-ethyl-1-methyl-pyrrolidinium
1-hexyl-1-methyl-pyrrolidinium
1,3-methyl-imidazolium
1-ethyl-2-3-methyl-imidazolium
1-propyl-2-3-methyl-imidazolium
1-pentyl-3-methyl-imidazolium
1-decyl-3-methyl-imidazolium
1-dodecyl-3-methyl-imidazolium
1-benzyl-3-methyl-imidazolium
1-ethyl-3-methyl-imidazolium
1-hexyl-2-3-methyl-imidazolium
1-hexadecyl-2-3-methyl-imidazolium
1-hexadecyl-3-methyl-imidazolium
1-hexyl-3-methyl-imidazolium
1-methyl-3-(3-phenyl-propyl)-imidazolium
1-octyl-3-methyl-imidazolium
1-octadecyl-3-methyl-imidazolium
1-tetradecyl-3-methyl-imidazolium
3-methyl-imidazolium
1-ethyl-pyridinium
1-butyl-pyridinium
1-hexyl-pyridinium
4-methyl-n-butylpyridinium
1-hexyl-4-methyl-pyridinium
1-octyl-1-methyl-pyrrolidinium
1-octyl-pyridinium
4-methyl-1-octyl-pyridinium
trihexyl-tetradecyl-phosphonium
triisobutyl-methyl-phosphonium
tetrabutyl-phosphonium
benzyl-triphenyl-phosphonium
guanidinium
N,N,N,N-tetramethyl-N-ethylguanidinium
N,N,N,N,N-pentamethyl-N-propyl-guanidinium
N-butyl-isoquinolinium
O-ethyl-N,N,N,N-tetramethylisouronium
O-methyl-N,N,N,N-tetramethylisouronium
S-ethyl-N,N,N,N-tetramethylisothiouronium Other cations include sulfonium ions of the formula

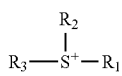

Other cations include Li⁺.

The anion can have the formula

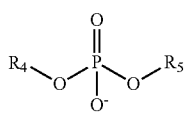

In certain embodiments, the R groups can be

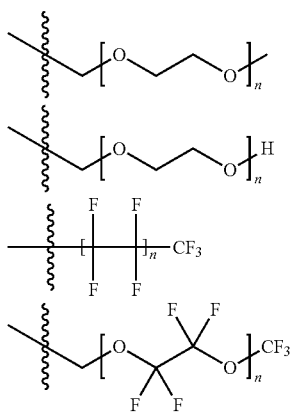

The starting compounds described herein can be synthesized according to the methodologies described and shown herein and using ordinary synthetic methodologies.

The new class of safe electrolytes based on a phosphate diester anion, such as methoxyethoxymethyl-functionalized phosphate diester ionic liquids. As shown in FIG. 1, polyether (e.g., methoxyethoxymethyl) functional groups can be incorporated in either the cation or anion, or both, to improve the kinetics of Lithium-ion diffusion and electrode/electrolyte interfacial transfer through explicit solvation of the lithium cation, in a manner similar to well-known ethereal and crown-ether solvents. See, for example, Shimizu, M., Usui, H. & Sakaguchi, H. Functional ionic liquids for enhancement of Li-ion transfer: the effect of cation structure on the electrode. Phys. Chem. Chem. Phys. 18, 5139-5147 (2015) and Martins, V. L., Sanchez-Ramirez, N., Ribeiro, M. C. C. & Torresi, R. M. Two phosphonium ionic liquids with high Li⁺ transport number. Phys. Chem. Chem. Phys. 17, 23041-23051 (2015), which is incorporated by reference in its entirety. The synthesis is comprised of two steps: 1) Alcoholysis of OPCl₃ to form a phosphate triester; 2) Quaternization of an amine by the resultant phosphate triester to afford a phosphate diester ionic compound or ionic liquid (FIG. 1).

Figure 2:
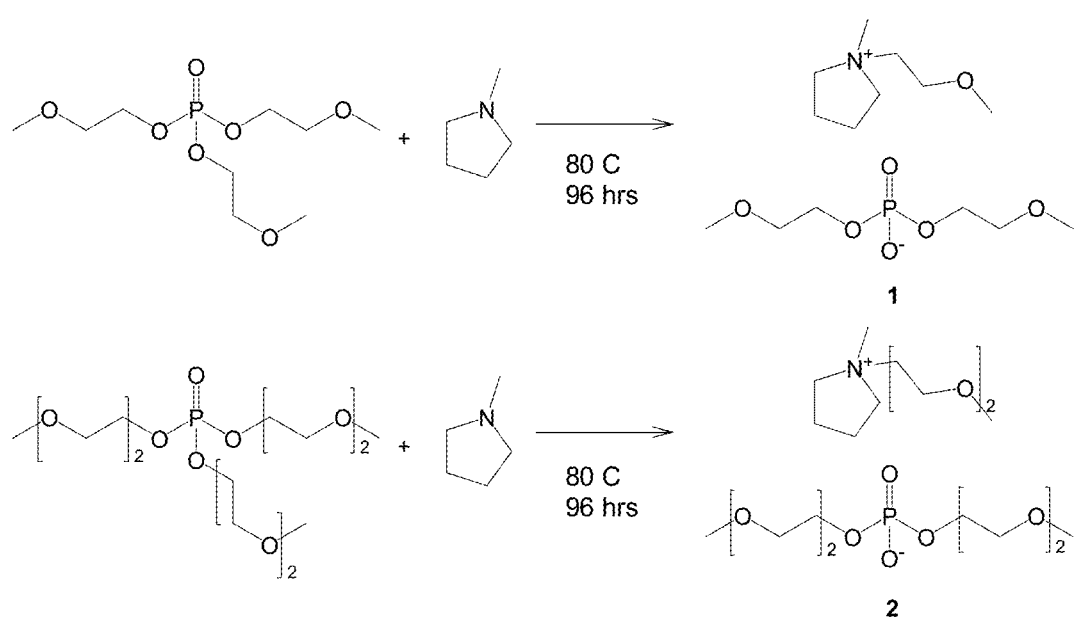
FIG. 2 is a schematic depicting synthesis of phosphate diester ionic compounds 1 and 2.

Treatment of a phosphate triester with tertiary amines at elevated temperature affords room temperature ionic liquids of 1-(2-methoxyethyl)-1-methylpyrrolidinium) bis(2-methoxyethyl)phosphate [PYR₁ME][O₂P(OME)₂] (1) and 1-(2-(2-methoxyethoxy)ethoxy)-1-methylpyrrolidinium) bis(2-(2-methoxyethoxy)ethyl)phosphate [PYR₁MEE][O₂P(OMEE)₂] (2) in high yield (>92%), often approaching 100% (FIG. 2). The resulting ionic compound have been fully characterized by ¹H, ³¹P, ¹³C NMR, ESI-MS (Electrospray-ionization masspectroscopy) and infrared spectroscopy (IR). This synthesis has a complete atom economy since all atoms of the starting materials are incorporated into the IL that is produced and no byproduct is generated. This is in sharp contrast to the synthesis of conventional, commercially available ionic liquids invariably relies on passage of the material through an ion exchange column or salt metathesis, which suffer from low yield, high cost, and tedious purification procedures, which are invariably required. The present synthesis of phosphate diester ILs is unique with respect to the preparation of many commercially available IL in that byproducts, such as acid, water or salts are not generated during the formation of the ionic liquid, eliminating the need for costly purification of the ILs. The starting phosphate triester can be prepared directly from commercial reagents and solvents on multigrams-scale (e.g., kilogram-scale). The availability and low cost of phosphates and amines open up the door to producing large quantities of high-quality ionic compounds.

Figure 3:
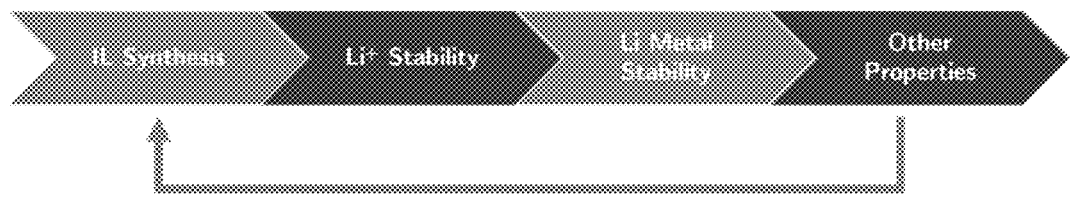
FIG. 3 is a schematic depicting optimization of IL electrolytes and targeted ILs.
Figure 6A:
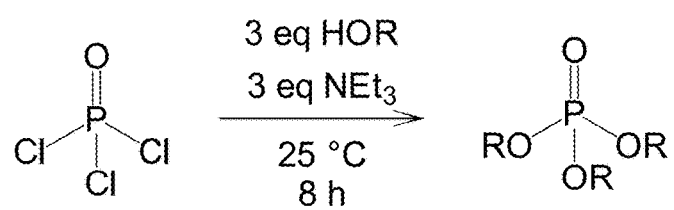
FIG. 6A is a schematic depicting a synthetic route to phosphate diester Li salts.
Figure 6B:
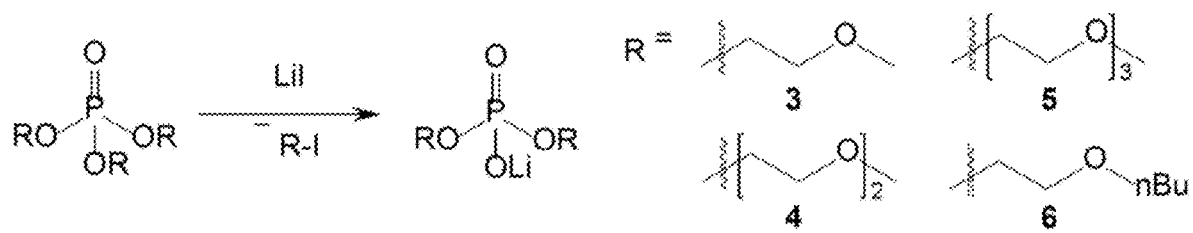
FIG. 6B is a schematic depicting a synthetic route to phosphate diester Li salts 3-6.
Figure 29:
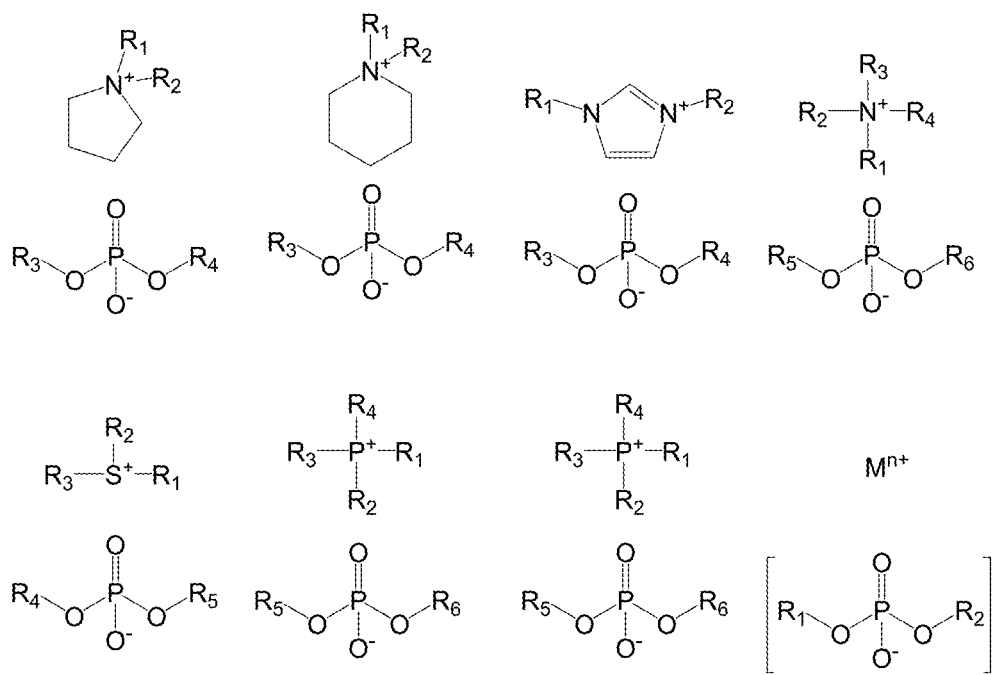
FIG. 29 is a scheme depicting phosphate ester ionic compounds accessible by the disclosed synthetic methods.
Figure 29:
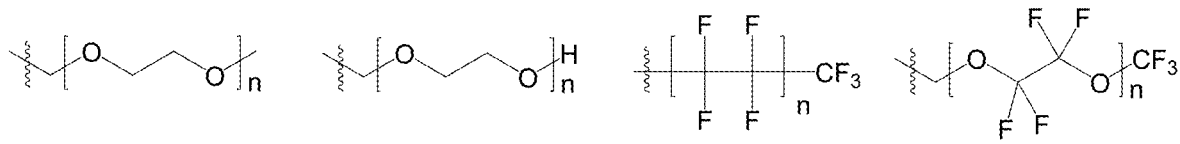
Figure 30:
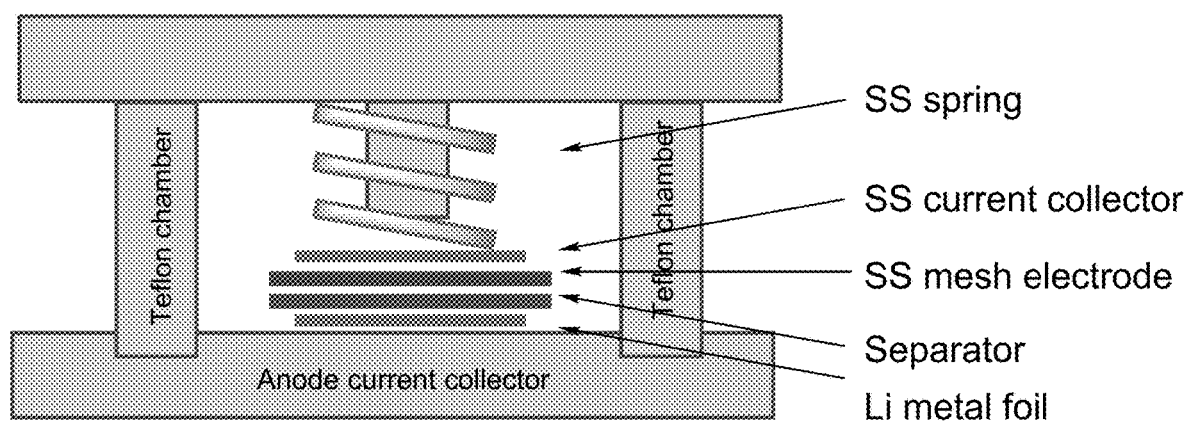
FIG. 30 depicts a prototype cell configuration for cyclic voltammetry measurement.

Working under this synthetic manifold can allow for the rapid development of a series of phosphate diester ionic liquids with vast structural diversity (e.g., on both cation and anion) (FIG. 29), allowing the properties of the IL to be tuned at the molecular level, for example, through a series of lithium salts of phosphate diester anions with vast structural diversity. For example, the lithium salts of phosphate diester were synthesized in 81-85% yield via Finkelstein reaction (FIG. 6B). The alkyl iodide, the byproduct generated through treatment of phosphate triester with lithium iodide, can be easily separated from the desired phosphate diester salt by vacuum evaporation, making the preparation of compounds 3-6 convenient and straightforward. Through the control of phosphate diester structures, unique properties of the electrolyte such as the operable temperature range, viscosity and mechanical flexibility, can be modified accordingly, which is desirable for specialized applications (FIG. 3).

Figure 4A:
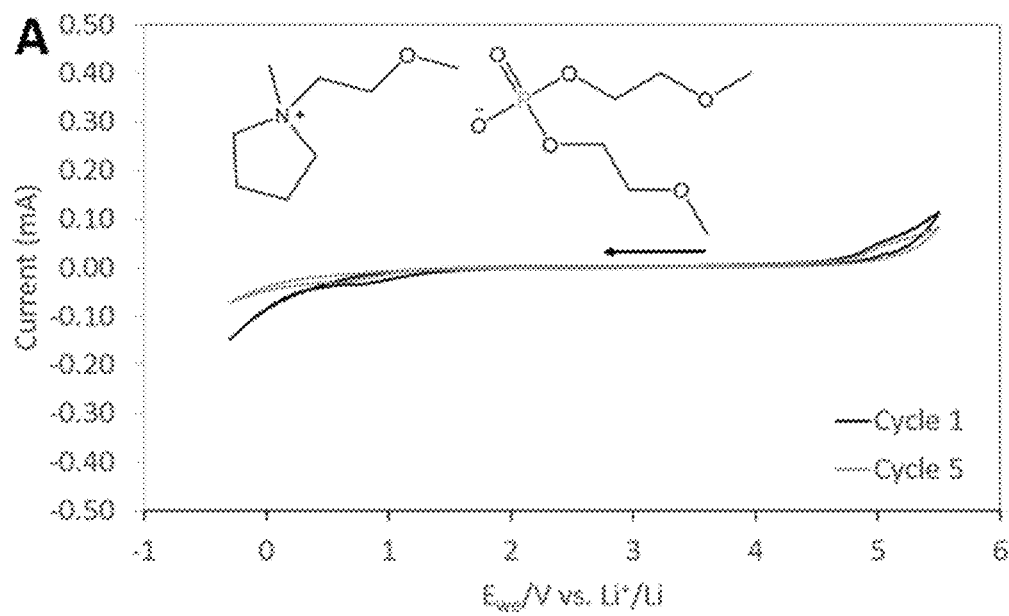
FIG. 4A depicts cyclic voltammetry of [PYR$_1$ME][O$_2$P(OME)$_2$] (1) 0.1M LiTFSI; Separator: Whatman GF/A glassy microfiber; Working electrode: SUS mesh; Reference electrode: Li metal; Counter electrode: Li metal; Scan rate: 1 mV/s, prototype cell configuration for Cyclic voltammetry measurement can be found in FIG. 18.
Figure 4B:
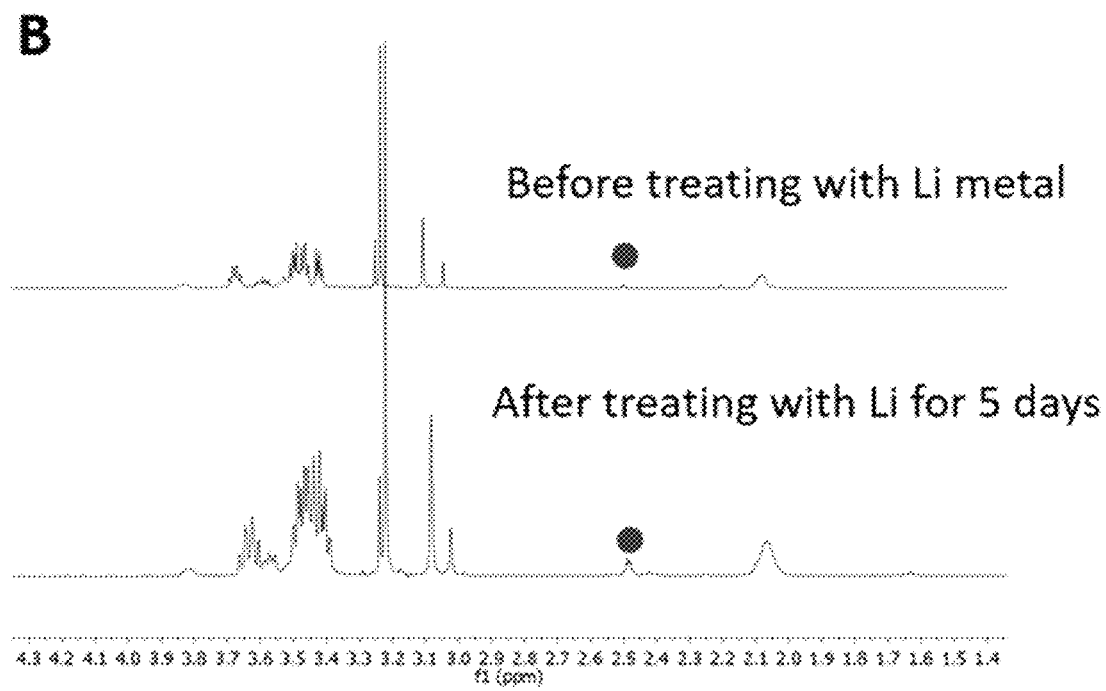
FIG. 4B depicts $^1$H NMR of 1 before (DMSO, 500 MHz, RT) and after (DMSO, 300 MHz, RT) treatment with fresh Li metal under Ar for five days, no reaction between 1 and Li metal was observed. DMSO solvent peaks are indicated by blue circles.

To demonstrate the utility of phosphate diester ILs as an electrolyte in Lithium-ion cells, the electrochemistry and Li-ion transport properties of pilot room temperature ionic compounds 1 and 2 were explored. These new electrolytes have excellent compatibility with Li metal (FIG. 4B) and are highly resistant to oxidation and reduction (FIG. 4A, ca. 5 V electrochemical window), desirable properties for high voltage Li-ion batteries, such as LNMO spinel/graphite cells. See, for example, Santhanam, R. & Rambabu, B. Research progress in high voltage spinel LiNi$_{0.5}$Mn$_{1.5}$O$_4$ material. J. Power Sources 195, 5442-5451 (2010), which is incorporated by reference in its entirety.

Figure 5A:
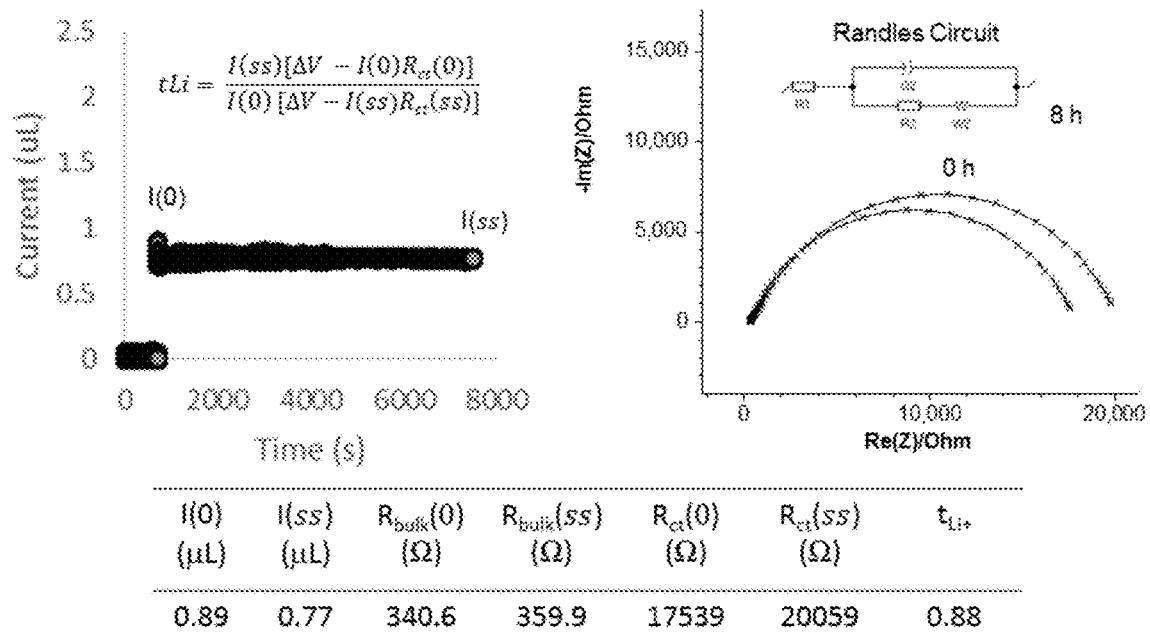
FIG. 5A represents Li transference number measurement (23 degrees C.) of [PYR$_1$ME][O$_2$P(OME)$_2$] and 0.1M LiTFSI; Separator: Whatman GF/A glassy microfiber thickness 270 μm; Li/Li symmetrical cell; electrode area: 1.911 cm$^{-2}$; prototype configuration for Li/Li symmetrical cell can be found in FIG. 20.
Figure 5B:
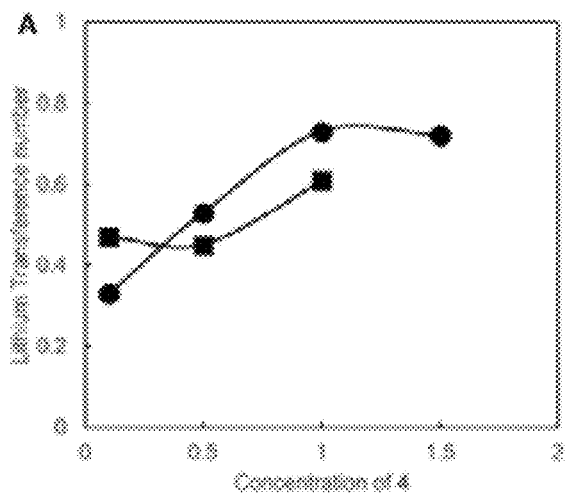
FIGS. 5B and 5C are graphs depicting that lithium transference number ($t^0_+$) measured by steady state current method (●) and PFG-NMR method (■), as a function of salt concentration at 23° C.
Figure 5C:
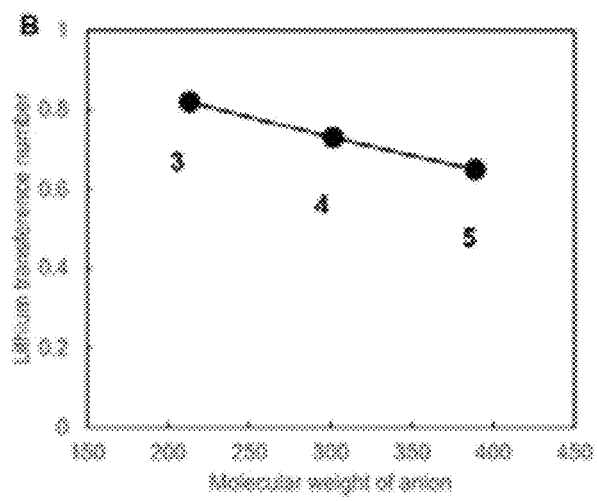

To further evaluate the utility of phosphate diester IL as an electrolyte in a Li-ion cell, the apparent lithium-ion transference number ($t^0_{Li}$ or $t^0_+$) (a parameter in the range of 0 to 1 describing the contribution of lithiumi-ion to overall ion conduction across the cell) of 1 with LiTFSI (0.1 M) was determined by a combined measurement of AC impedance and DC polarization in a standard symmetrical Li/Li cell at 23 degrees C. See, for example, Bruce, P. G. & Vincent, C. A. Steady state current flow in solid binary electrolyte cells. J. Electroanal. Chem. 225, 1-17 (1987), which is incorporated by reference in its entirety. The data extracted from electrical impedance spectroscopy (EIS) and chronoamperometry (CA) were analyzed using the equation in FIG. 5A. The Li transference number of 1 was determined to be 0.82 (4) (average of three measurements) (FIGS. 5A-5C). The remarkably high transference number is more than double of that for conventional electrolytes (carbonate 0.20), PEO polymer electrolyte (0.25-0.30) and commercial ionic liquids (EMITFSI 0.08). See, for example, Riley, M., Fedkiw, P. S. & Khan, S. a. Transport Properties of Lithium Hectorite-Based Composite Electrolytes. *J. Electrochem. Soc.* 149, A667 (2002), Appetecchi, G. B., Zane, D. & Scrosati, B. PEO-Based Electrolyte Membranes Based on LiBC4O8 Salt. *J. Electrochem. Soc.* 151, A1369 (2004), and Kim, H.-T. et al. Pyrrolinium-based Ionic Liquid as a Flame Retardant for Binary Electrolytes of Lithium Ion Batteries. *ACS Sustain. Chem. Eng.* 497-505 (2015), which is incorporated by reference in its entirety. Electrolytes with low Lithium-ion transference number often have poor high-rate performance and limited power output due to severe polarization of the salt solute. Concentration gradient built up during current flow can cause precipitation of salt on the anode and depletion at cathode, resulting in cell failure. See, for example, Scrosati, B. Power sources for portable electronics and hybrid cars: Lithium batteries and fuel cells. *Chem. Rec.* 5, 286-297 (2005), which is incorporated by reference in its entirety. The presence of polyether functional groups in both cation and anion significantly improved lithium-ion transference number in the electrolyte. However, the large $R_{bulk}$ and $R_{ct}$ value indicate that 1/LiTFSI electrolyte has a low ion conductivity, perhaps due to the high viscosity, therefore impacting its potential for application in Lithium-ion batteries. The only electrolyte system possessing a higher Li transference number than that of the ILs described herein is an extremely costly perfluoropolyether-based electrolyte (0.92). See, for example, Wong, D. H. C. et al. Nonflammable perfluoropolyether-based electrolytes for lithium batteries. *Proc. Natl. Acad. Sci.* 111, 3327-3331 (2014), which is incorporated by reference in its entirety. The presence of polyether (e.g., methoxyethoxymethyl) functional groups in both cation and anion significantly improved lithium-ion transference number in the electrolyte. However, the large $R_{bulk}$ and $R_{ct}$ values indicate that 1/LiTFSI electrolyte has a low ion conductivity, perhaps due to the high viscosity, therefore limiting its potential for application in Lithium-ion batteries. The small $R_{bulk}$ value indicates high ion conductivity of 1 and therefore lower overpotential during cell cycling and other conditions.

To improve the ion conductivity of the phosphate diester electrolytes, attention was turned to the lithium salts of phosphate diester anions 3-6, which can be used as solutes in organic solvents (such as carbonates and ethers) to prepare electrolytes with low viscosity. The effects of salt concentration and anion molecular structure on the electrolyte performance was further investigated, taking into account of parameters such as conductivity and lithium transference number (Table 1). Table 1 depicts the conductivity and lithium-ion transference number data of the new electrolytes. The conductivity of the electrolyte is estimated based on overpotential in Li/electrolyte/Li cell. Lithium-ion transference number was evaluated by DC polarization in conjunction with AC impedance spectroscopy according to a literature procedure. See, for example, Bruce, P. G., Vincent, C. A. *J Electroanal. Chem.* 1987, 225 (1-2), 1, which is incorporated by reference in its entirety.

TABLE 1

| Salt/solvent | Concentration (M) | Conductivity (µS/cm) | $t^0_+$ |
|---|---|---|---|
| 3/DMC | 1M | 1.92 | 0.82 |
| 4/diglyme | 0.1M | 1.67 | 0.33 |
| 4/diglyme | 0.5M | 2.46 | 0.53 |

TABLE 1-continued

| Salt/solvent | Concentration (M) | Conductivity (µS/cm) | $t^0_+$ |
|---|---|---|---|
| 4/diglyme | 1M | 2.72 | 0.73 |
| 4/diglyme | 1.5M | 2.25 | 0.72 |
| 4/DMC | 1M | 1.92 | 0.82 |
| 5/diglyme | 1M | 24.6 | 0.65 |
| 6/diglyme | 1M | 12.9 | 0.83 |

A strong dependence of lithium transference number on the salt concentration was observed (FIG. 5B). The rise in $t^0_{Li}$ value with increasing salt concentration can be attributed to the reduction in anion mobility resulting from the increasing intermolecular interaction between the phosphate diester anions. Both the size and the molecular weight of phosphate diester anions were expected to have an effect on the lithium-ion transference number. Interestingly, the lithium transference number decreases as the molecular weight of the anions increases (FIG. 5C), perhaps due to the increasing cation-anion aggregation.

Figure 35:
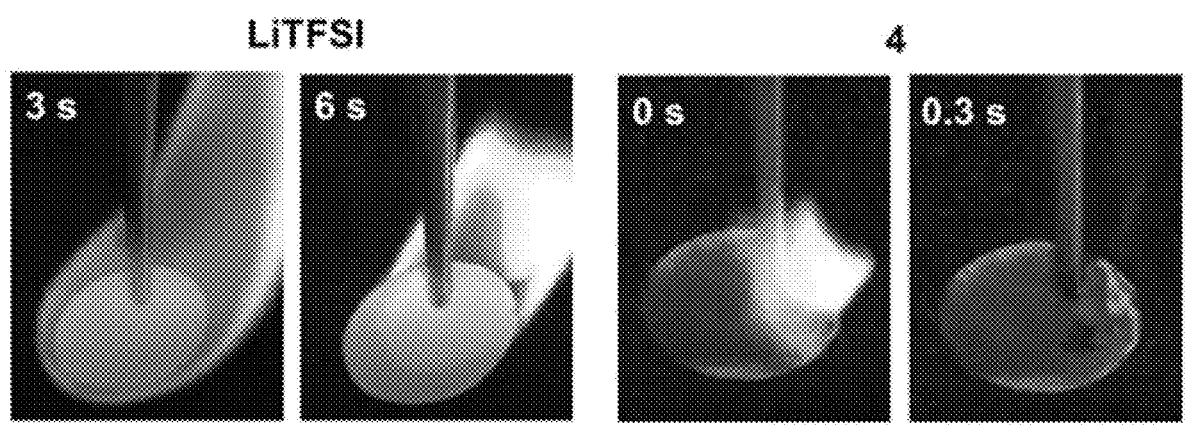
FIG. 35 depicts photographs of the influence of lithium phosphate diester salt on the flammability of electrolyte. Digital picture images of burning of dimethylcarbonate with LiTFSI solute (1.0 M, left) and with 4 solute (1.0 M, right). The times counted from when flame started are indicated in each image.

A key advantage of phosphate diester electrolytes (1-6) over existing electrolyte systems is the improved cell safety by introducing a mechanism for the electrolyte material to become flame retardant. In the event of cell failure, the phosphate ester electrolytes are not only combustion resistant, but also undergo thermolysis to form protective charr and phosphate glass layers (for example, upon exposure to extreme temperatures), leading to separation of the propagating flame from the unburned electrolyte, inhibiting the fire from spreading to neighboring cells and reducing the risk of catastrophic thermal runaway. See, for example, Scharte, B. Phosphorus-based flame retardancy mechanisms-old hat or a starting point for future development. *Materials (Basel).* 3, 4710-4745 (2010), and Lalia, B. S., Yoshimoto, N., Egashira, M. & Morita, M. A mixture of triethylphosphate and ethylene carbonate as a safe additive for ionic liquid-based electrolytes of lithium ion batteries. *J. Power Sources* 195, 7426-7431 (2010), which is incorporated by reference in its entirety. Indeed, using lithium phosphate diester salts as solute at a concentration above 1.0 M significantly suppresses the flammability of organic solvents. As shown in FIG. 35, the electrolyte prepared from dimethylcarbonate and LiTFSI (1.0 M) was easily ignited and combusted violently. However, when 4 was used in place of LiTFSI, the flame quickly self-extinguished. The self-extinguishing time (SET, flame combustion time normalized by electrolyte mass) of the dimethylcarbonate electrolyte reduced from 6.3 seconds to 0.4 second. At elevated temperature, the phosphate diester anions can generate free radicals, such as PO• and PO₂•, active toward capturing reactive radicals in burning organic solvents, therefore terminating or retarding the combustion chain reactions. See, for example, Granzow, A. *Acc. Chem. Res.* 1978, 11 (5), 177, which is incorporated by reference in its entirety. This unique property is inherent to the electrolyte design and no currently available organic electrolyte can claim this feature.

Ionic compounds 1 and 2 may be immediately implemented in energy storage technologies. Using 1 or 2 as electrolyte additives to current aprotic electrolyte systems can significantly suppress the flammability and enhance the thermal stability of lithium-ion cells. On the basis of such concept, binary electrolyte systems composed of organic solvent (carbonate or ether) and phosphate ester IL can have high ion conductivity, long cycle life and a substantially lower fire risk. Additionally, weakly-coordinating lithium salts can be synthesized using the similar synthetic strategy (FIG. 6A). The lithium phosphate diester salts 3-6 can be used in place of conventional electrolyte solutes, such as LiPF$_6$, LiClO$_4$ and LiTFSI, to improve the safety of current secondary Lithium-ion batteries.

A new class of low-cost and flame-retardant phosphate ester electrolytes has been prepared and synthetically modified the electrolyte structure to achieve high Li transference number and moderate ion-conductivity simultaneously. These electrolytes can be immediately implemented in Lithium-ion batteries to improve stability of Lithium-ion cells, one of the pressing issues electric vehicle industries are facing today.

Figure 7:
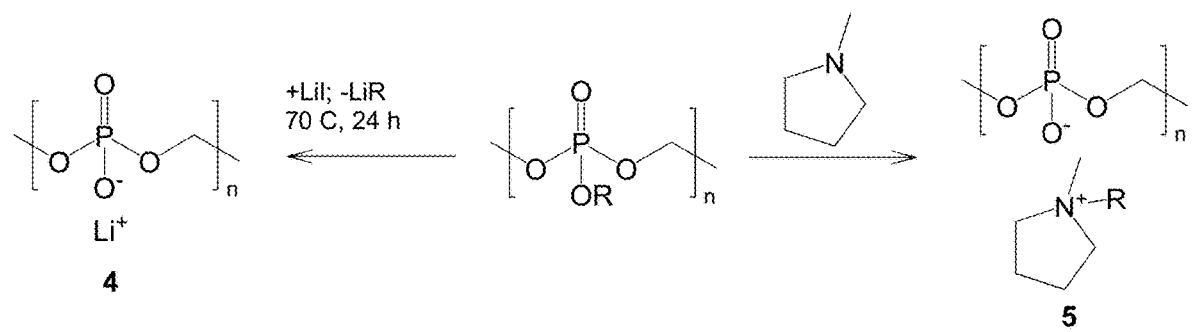
FIG. 7 is a schematic depicting a single step synthesis of phosphate diester Li conductive polymer 4 and phosphate ester polymer gel electrolyte 5.

The new methodology disclosed here for the conversion of phosphate triesters to lithium salts can be extended beyond small molecule systems and applied to the preparation of lithium-ion conductive polymer materials 4 (FIG. 7). Phosphate gel polymer electrolyte 5 can also be prepared in a single step. In such polymer electrolyte systems, intrinsic electronic conductivity is not necessary, as the lithium hopping between the phosphate ester repeating units can provide the necessary ionic conductivity while the polymer backbone provides mechanical integrity. The phosphate diester polymer gel electrolyte will have high room temperature ion conductivity, good mechanical strength and high transference number, desirable properties for Li-ion battery, super capacitors and electrochromic devices. See, for example, Manuel Stephan, A. Review on gel polymer electrolytes for lithium batteries. *Eur. Polym. J.* 42, 21-42 (2006), which is incorporated by reference in its entirety.

Figure 34:
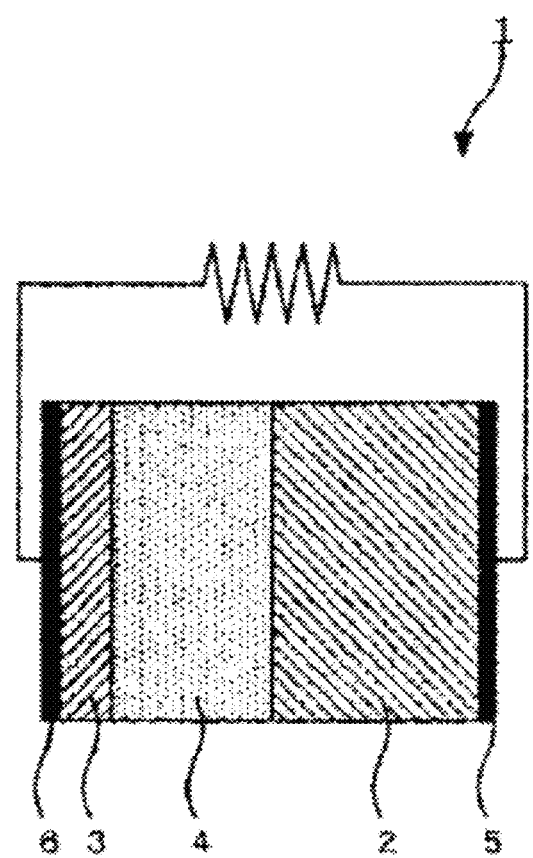
FIG. 34 is a drawing depicting a battery.

FIG. 34 schematically illustrates a rechargeable battery 1, which includes anode 2, cathode 3, electrolyte 4, anode collector 5, and cathode collector 6. The battery can include a housing including an electrolyte (not shown). The battery can be a lithium battery, for example, a lithium ion battery.

The phosphate diester functional group plays a critical role in connecting individual nucleotides in DNA and RNA—one of the most stable molecular architectures in biology. The negative charge carried by phosphate diesters suppresses nucleophilic attack and degradation, providing exceptional stability against hydrolysis. In a similar manner, water stability of the invented phosphate ionic compounds or polymer constructed by phosphate diester bonds can be expected to behave in a manner analogous to DNA and RNA. The similar properties between the invented ILs and phosphate diester linkages in DNA suggest the potential application of 1 and 2 as non-toxic and biodegradable electrolytes for bioelectric batteries. Slow enzymatic decomposition of 1 and 2 in vivo will only produce non-toxic phosphates and alcohols. Coupled with biocompatible electrodes, the invention described above can be directly applied to the fabrication of biocompatible batteries that are in high demand and used to power implantable medical devices. Programmable degradation of such biobatteries can be effected by altering the molecular structure of the phosphate polymer electrolytes, providing a benign pathway for the slow controlled degradation of implanted devices while obviating the need for later surgical removal.

EXAMPLES

Unless otherwise stated, all manipulations were performed under an inert atmosphere of purified N$_2$ in a Vacuum Atmospheres model MO-40M glovebox. All phosphate trimester precursors were prepared as previously reported (*ACS Appl. Mater. Interfaces*, 2013, 5, 13029-13034). All other reagents were purchased from Sigma Aldrich or Strem Chemicals, and used as received. Solvents (EMD Chemicals) were either purified on a Glass Contour Solvent Purification System built by SGWater USA, LLC, or prepared according to literature procedures. All NMR spectra were obtained on JEOL 502 instruments. $^{31}$P{$^1$H} NMR chemical shifts are reported with respect to an external reference (85% H3PO4, δ 0.0 ppm). Charcoal was dried by heating above 200° C. under dynamic vacuum for at least 24 h prior to use. Elemental analyses (EA) were performed by Robertson Microlit Laboratories, Inc. All cyclic voltammograms were recorded with a BioLogic Science Instruments SP-150 potentiostat using EC Lab V 10.44 software, measured at a scan rate of 100 mV/s, and referenced vs. Li.

Preparation and Characterization of Phosphate Diester Ionic Liquids

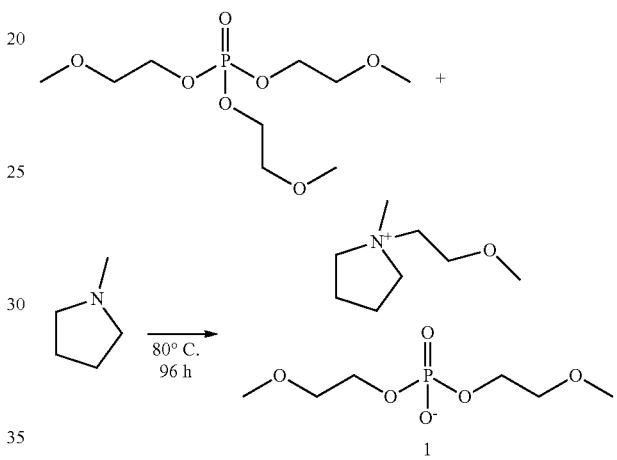

Figure 8:
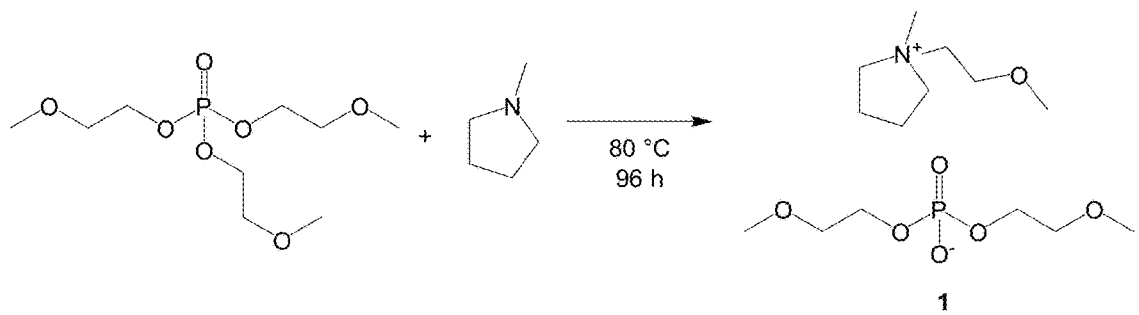
FIG. 8 depicts $^1$H NMR (DMSO-$d_6$, RT, 500 MHz) of 1-(2-methoxyethyl)-1-methylpyrrolidinium) bis(2-methoxyethyl)phosphate [PYR$_1$ME][O$_2$P(OME)$_2$] (1). DMSO solvent peak is indicated by a yellow circle, 1-(2-methoxyethyl)-1-methylpyrrolidinium) by blue circles and bis(2-methoxyethyl)phosphate by red circles.
Figure 8:
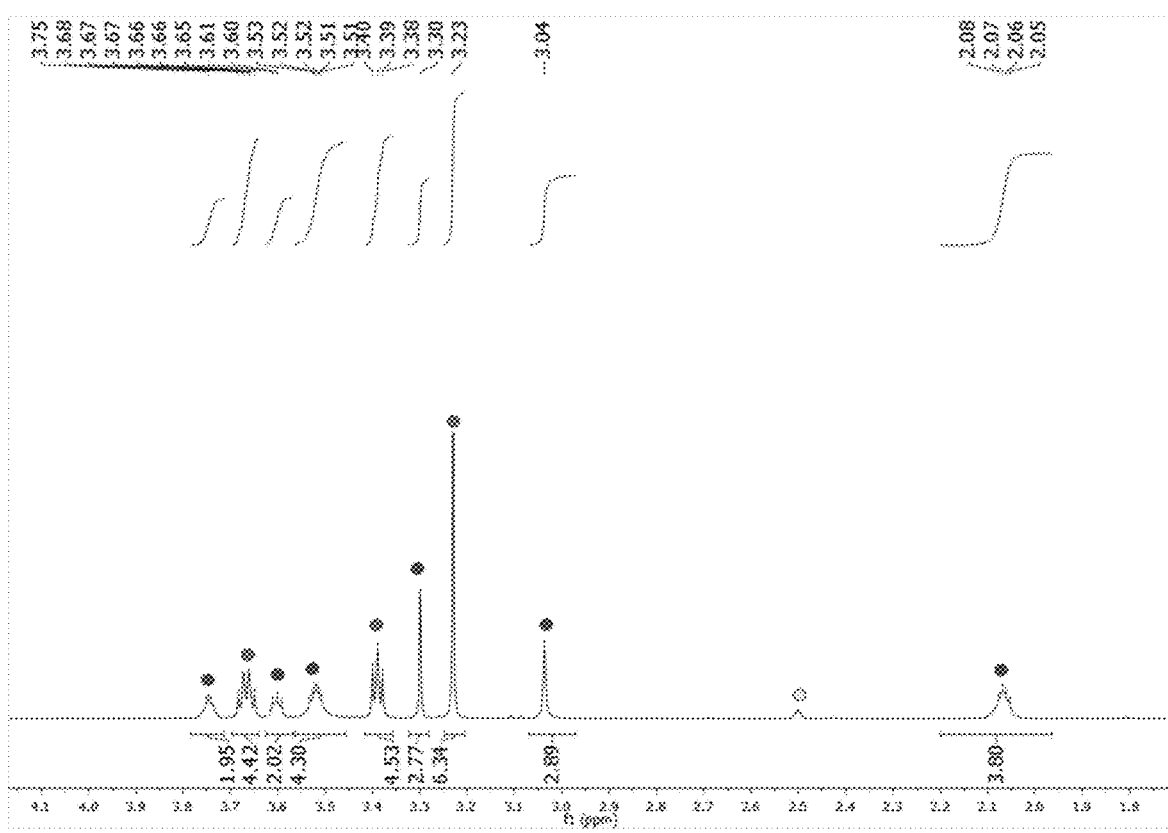
Figure 9:
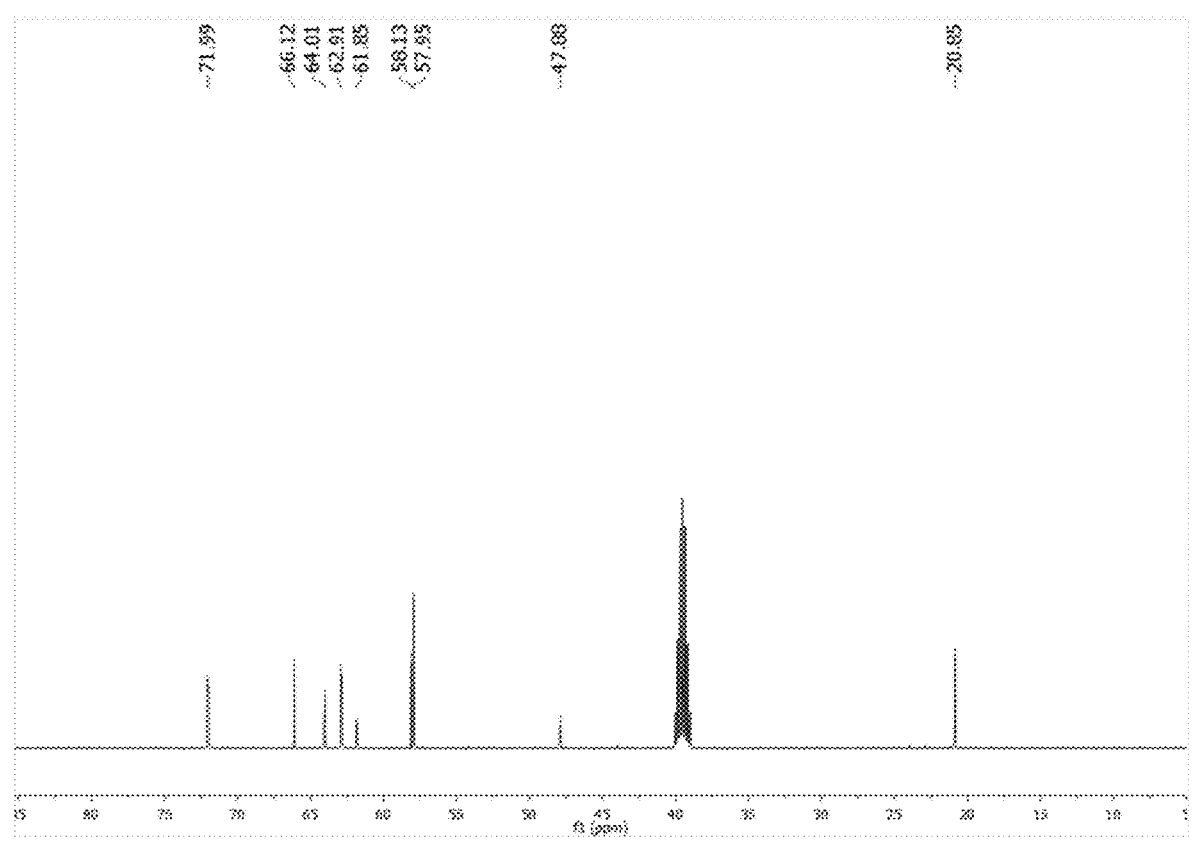
FIG. 9 depicts $^{13}$C NMR (DMSO-$d_6$, RT, 100 MHz) of 1-(2-methoxyethyl)-1-methylpyrrolidinium) bis(2-methoxyethyl)phosphate [PYR$_1$ME][O$_2$P(OME)$_2$] (1).
Figure 10:
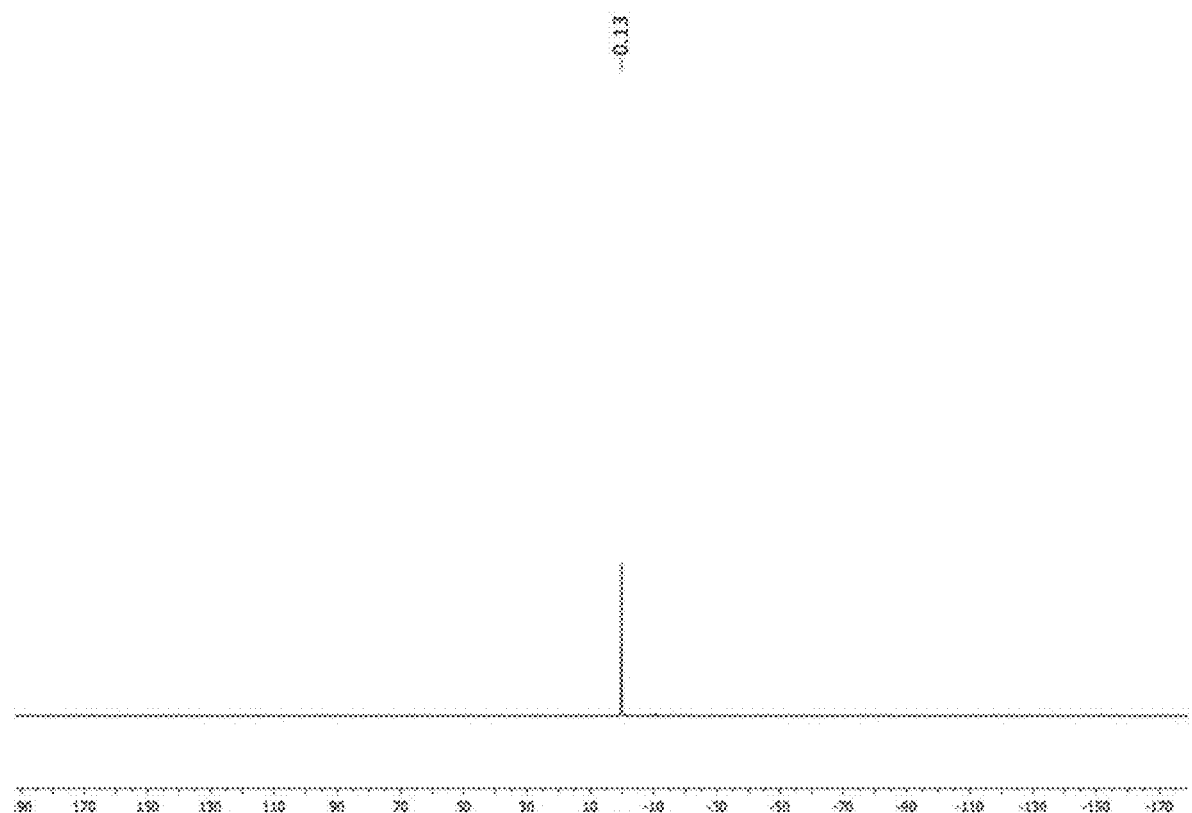
FIG. 10 depicts $^{31}$P NMR (DMSO-$d_6$, RT, 121 MHz) of 1-(2-methoxyethyl)-1-methylpyrrolidinium) bis(2-methoxyethyl)phosphate [PYR$_1$ME][O$_2$P(OME)$_2$] (1).
Figure 11:
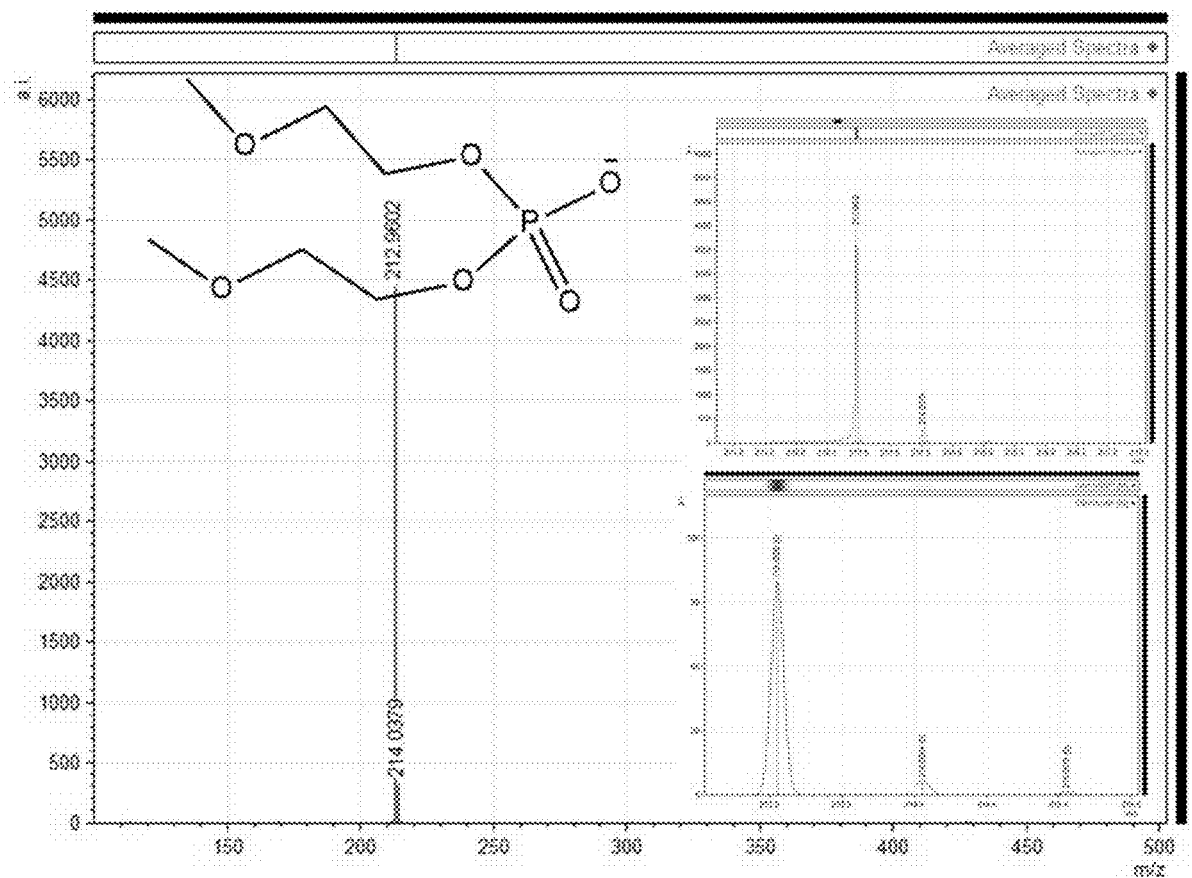
FIG. 11 depicts ESI-MS(−) spectrum of 1-(2-methoxyethyl)-1-methylpyrrolidinium) bis(2-methoxyethyl)phosphate [PYR$_1$ME][O$_2$P(OME)$_2$] (1), calculated 213.0533, found 212.9602.

In a glovebox, a Schlenk flask was charged with tris(2-methoxyethyl) phosphate (OP(OCH2CH2OMe)3 (2.6373 g, 9.688 mmol) and N-methylpyrolidine (5.036 mL, 48.43 mmol). The flask was sealed and heated at 80° C. for 96 h. All volatiles were removed under reduced pressure to give a light-yellow liquid. The resulting liquid was washed with hexane (20 mL, three times) and dried under vacuum to afford a viscous liquid. Yield: 3.108 g (92%, 8.898 mmol). $^1$H NMR (500 MHz, DMSO-d6): FIG. 8 δ 3.75 (br, 3), 3.66 (q, 4), 3.60 (b, 2), 3.52 (b, 4), 3.39 (t, 4), 3.30 (s, 3), 3.23 (s, 6), 3.04 (s, 3), 2.07 (b, 4). $^{13}$C{$^1$H} NMR (126 MHz, DMSO-d6): FIG. 9, δ 71.99, 66.12, 64.01, 62.91, 61.85, 58.13, 57.95, 47.88, 20.85. $^{31}$P{$^1$H} NMR (121 MHz, DMSOd6): FIG. 10, δ 0.13. Anal. Calcd. for 1 (C$_{14}$H$_{32}$NO$_7$P): C, 47.05; H, 9.03; N, 3.92. Found: C, 47.18; H, 9.38; N, 3.72. MS-ESI (m/z): FIG. 11, calculated 213.0533, found 212.9602.

Figure 12:
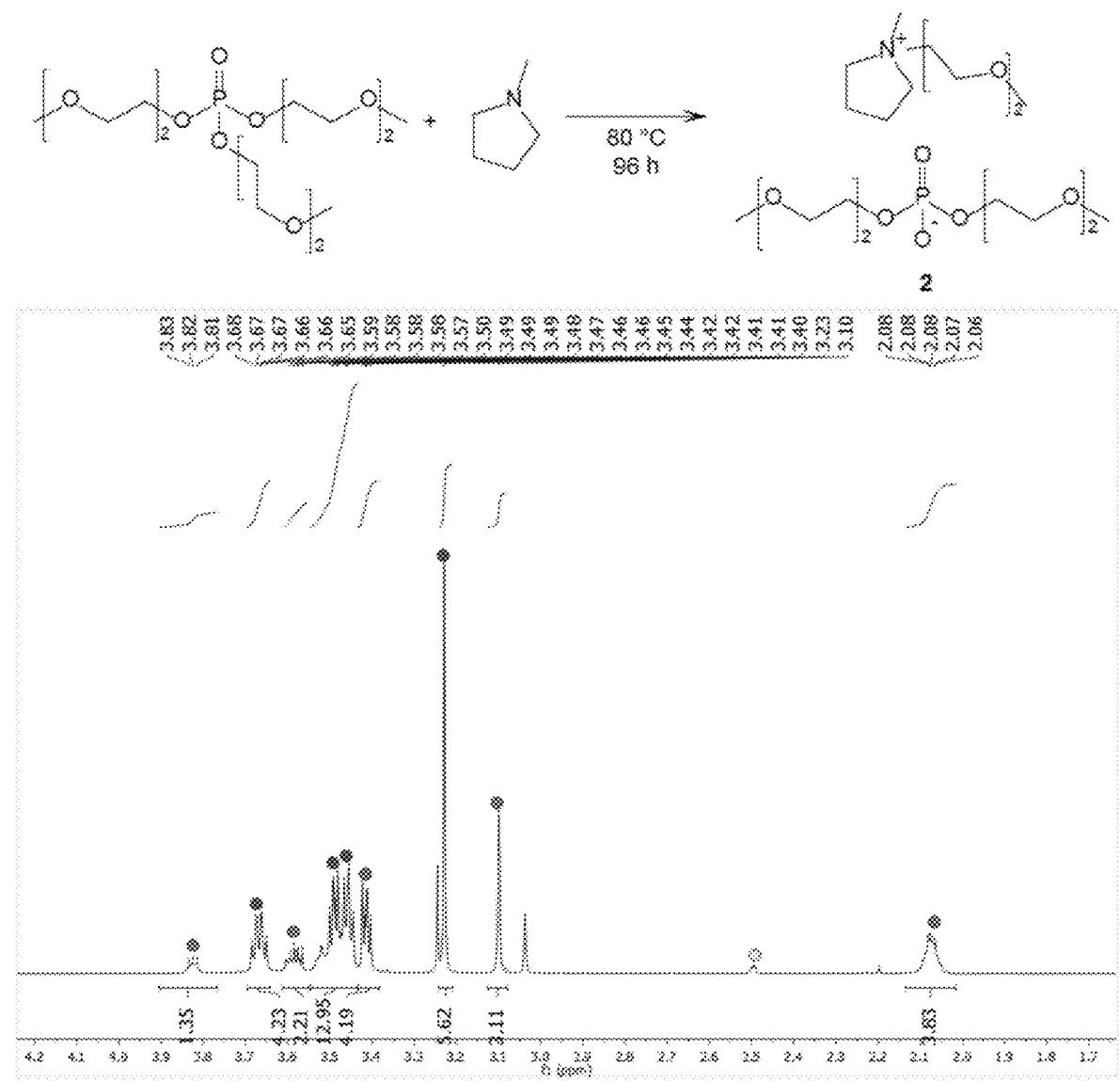
FIG. 12 depicts $^1$H NMR (DMSO-$d_6$, RT, 500 MHz) of 1-(2-(2-methoxyethoxy)ethoxy)-1-methylpyrrolidinium) bis (2-(2-methoxyethoxy)ethyl)phosphate [PYR$_1$MEE][O$_2$P (OMEE)$_2$] (2) DMSO solvent peak is indicated by a yellow circle, 1-(2-(2-methoxyethoxy)ethoxy)-1-methylpyrrolidinium) by blue circles and bis(2-(2-methoxyethoxy)ethyl) phosphate by red circles.
Figure 13:
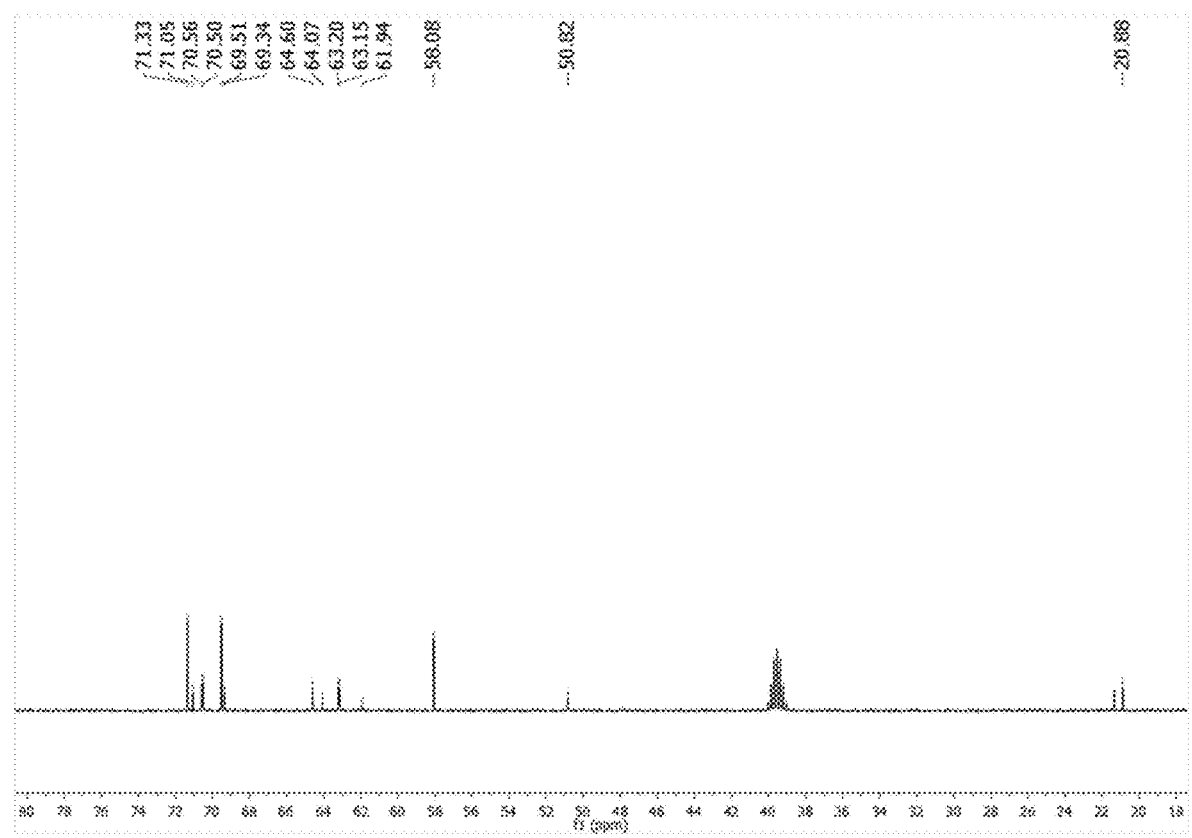
FIG. 13 depicts $^{13}$C NMR (DMSO-$d_6$, RT, 100 MHz) of 1-(2-(2-methoxyethoxy)ethoxy)-1-methylpyrrolidinium) bis (2-(2-methoxyethoxy)ethyl)phosphate [PYR$_1$MEE][O$_2$P (OMEE)$_2$](2).
Figure 14:
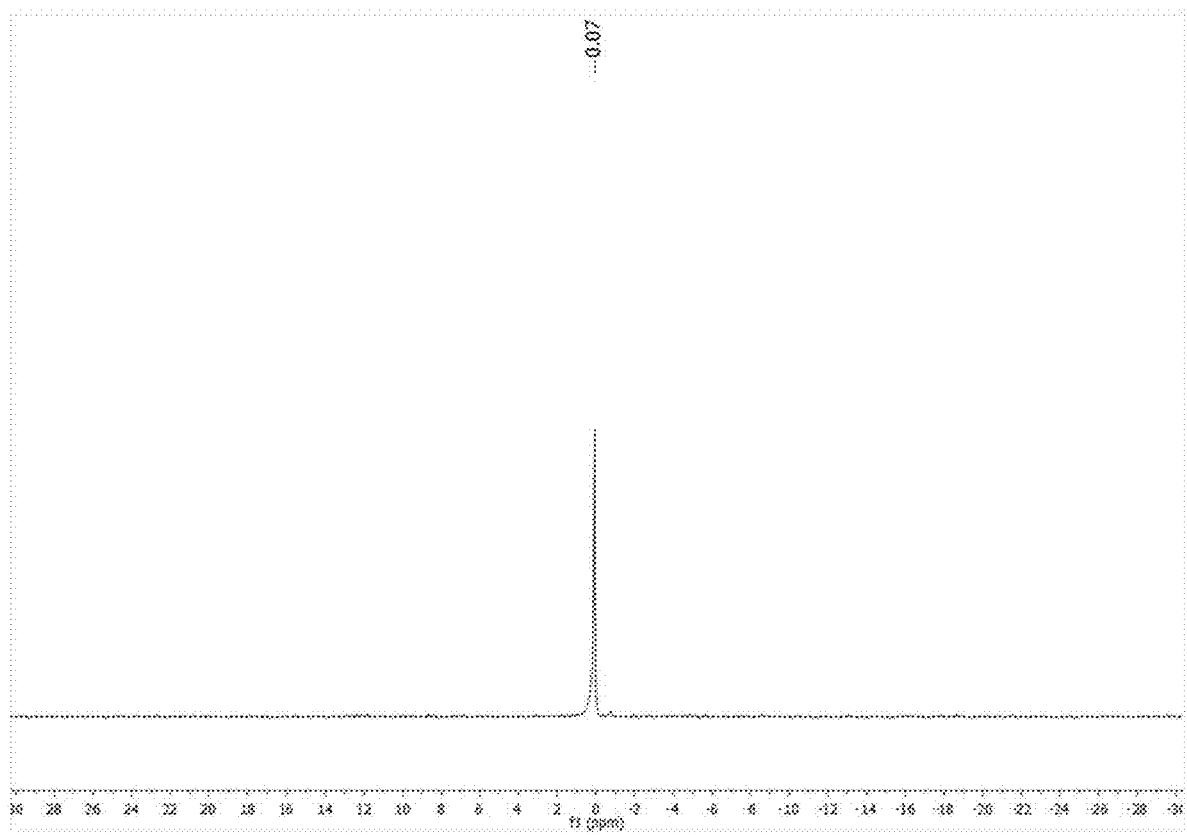
FIG. 14 depicts $^{31}$P NMR (DMSO-$d_6$, RT, 121 MHz) of 1-(2-(2-methoxyethoxy)ethoxy)-1-methylpyrrolidinium) bis (2-(2-methoxyethoxy)ethyl)phosphate [PYR$_1$MEE][O$_2$P (OMEE)$_2$](2).
Figure 15:
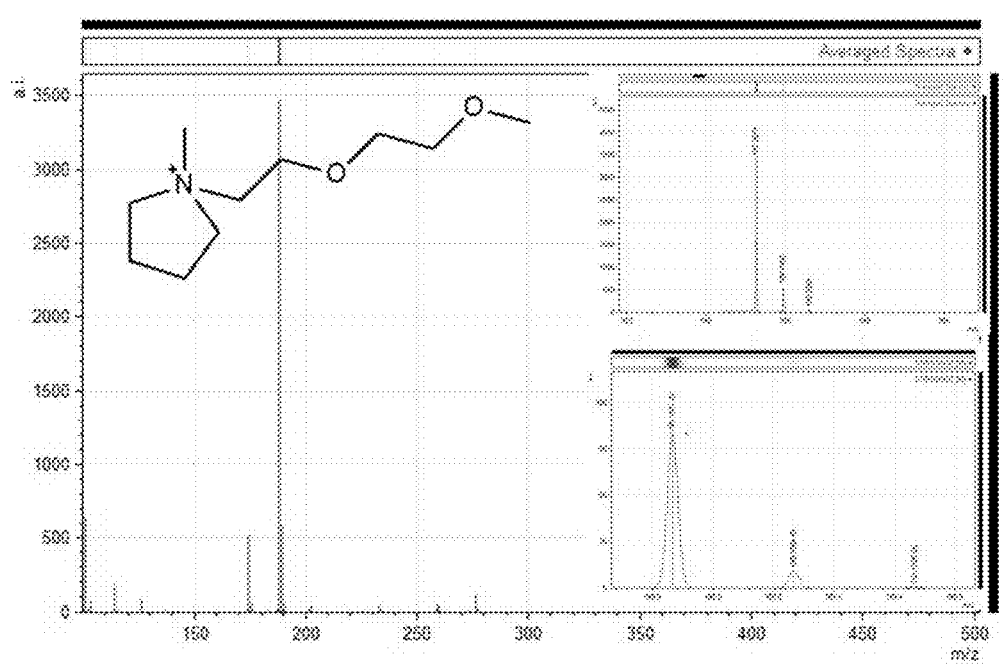
FIG. 15 depicts ESI-MS(+) spectrum of bis(2-(2-methoxyethoxy)ethyl)phosphate [PYR$_1$MEE][O$_2$P (OMEE)$_2$] (2).
Figure 16:
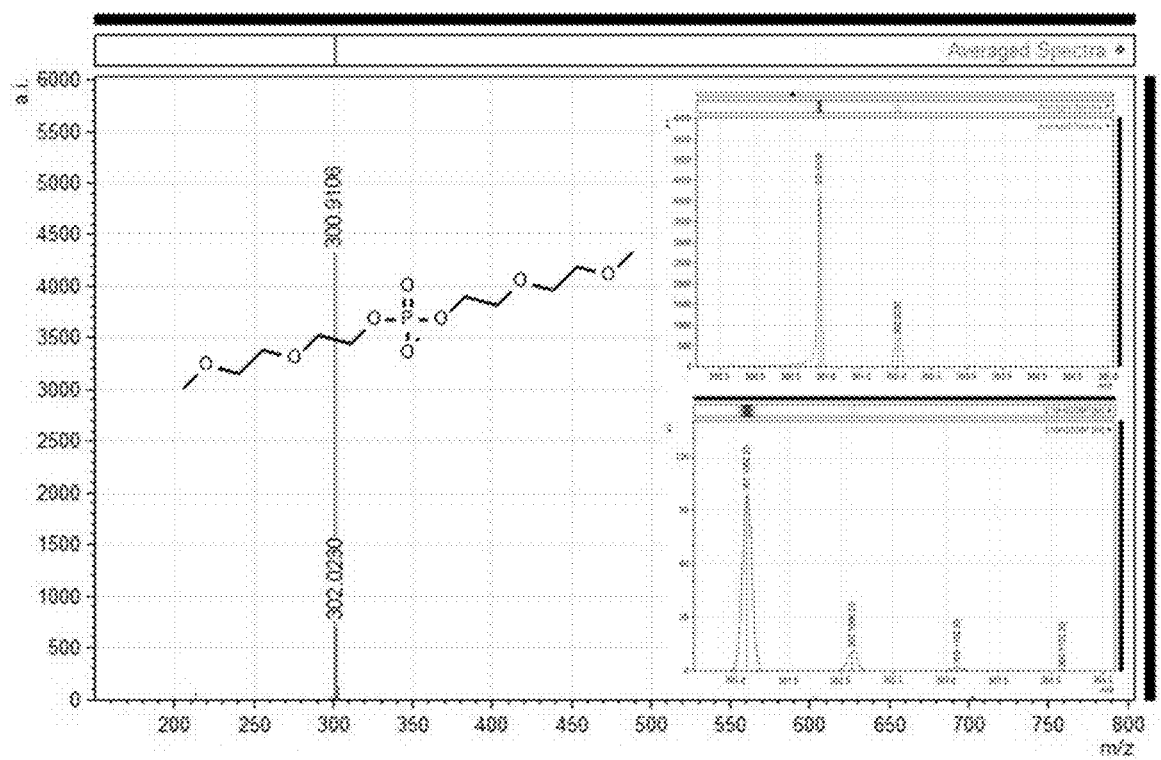
FIG. 16 depicts ESI-MS(−) spectrum of bis(2-(2-methoxyethoxy)ethyl)phosphate [PYR$_1$MEE][O$_2$P (OMEE)$_2$] (2), calculated 301.2523, found 300.9106.

In a glovebox, a Schlenk flask was charged with tris(2-methoxyethoxyethyl) phosphate (OP (OCH$_2$CH$_2$OCH$_2$CH2OMe)$_3$) (1.1923 g, 2.94 mmol) and N-methylpyrolidine (1.532 mL, 14.7 mmol). The flask was sealed and heated at 80° C. for 96 h. All volatiles were removed under reduced pressure to give a light-yellow liquid. The resulting liquid was washed with hexane (20 mL, three times) and dried under vacuum to afford a viscous liquid. Yield: 1.353 g (94%, 2.76 mmol). $^1$H NMR (500 MHz, DMSO-d6): FIG. 12, δ 3.83 (br, 2), 3.66 (q, 4), 3.67 (q, 4), 3.59 (t, 2), 3.58 (t, 2), 3.38 (t, 3), 3.24 (s, 3), 3.23 (s, 6), 3.04 (s, 3), 2.08 (b, 4). $^{13}$C{$^1$H} NMR (126 MHz, DMSO-d6): FIG. 13, δ 71.33, 71.05, 70.56, 70.50, 69.51, 69.34, 64.60, 64.07, 63.20, 63.15, 61.94, 58.08, 50.82, 20.08. $^{31}P\{^1H\}$ NMR (121 MHz, DMSO-d6): FIG. 14, δ 0.07. MS-ESI (m/z): FIG. 16, calculated 301.2523, found 300.9106.

Figure 17:
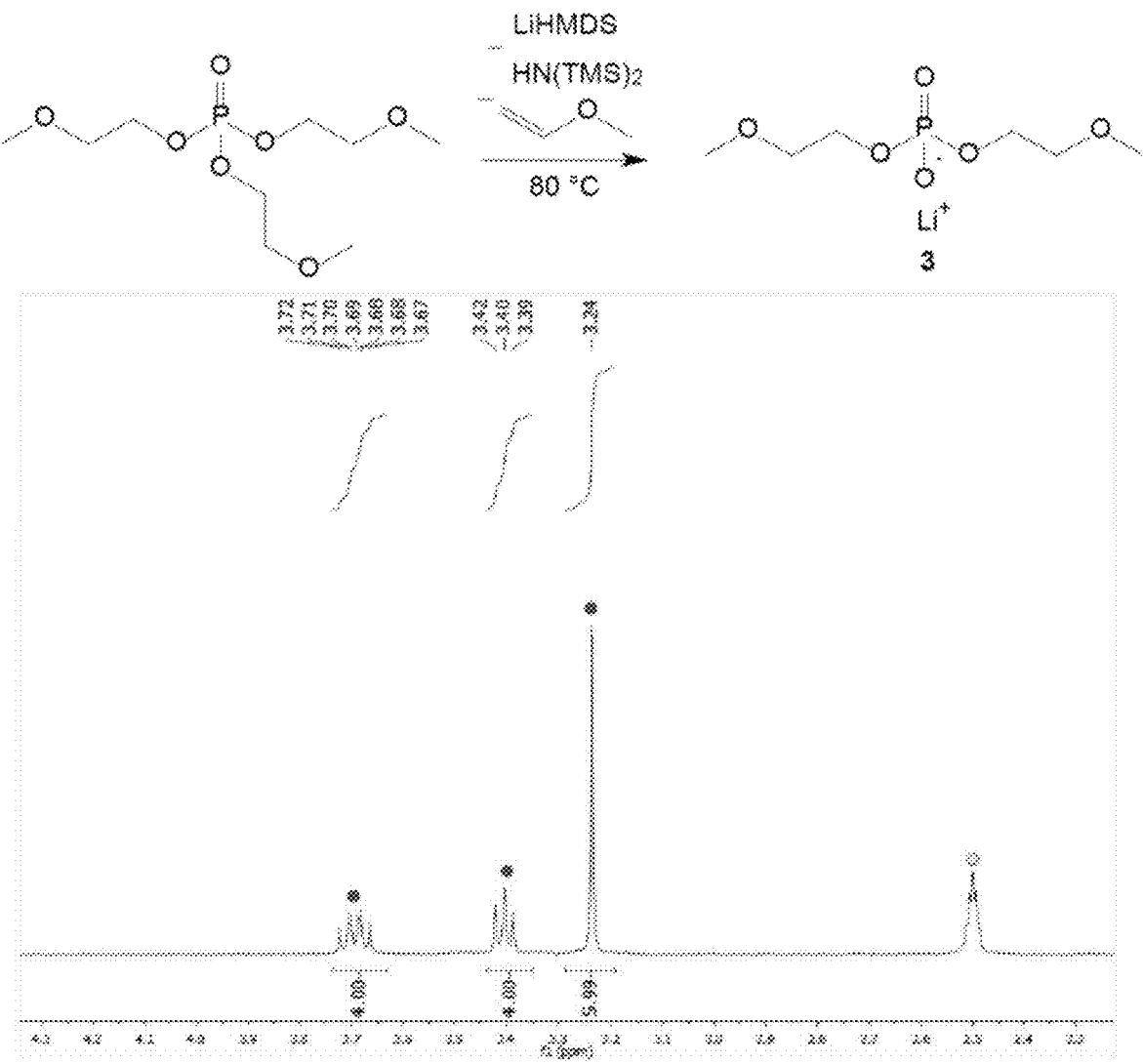
FIG. 17 depicts $^1$H NMR (DMSO-d6, RT, 500 MHz) of 3. DMSO solvent peak is indicated by a yellow circle, bis(2-methoxyethyl)phosphate by blue circles.
Figure 18:
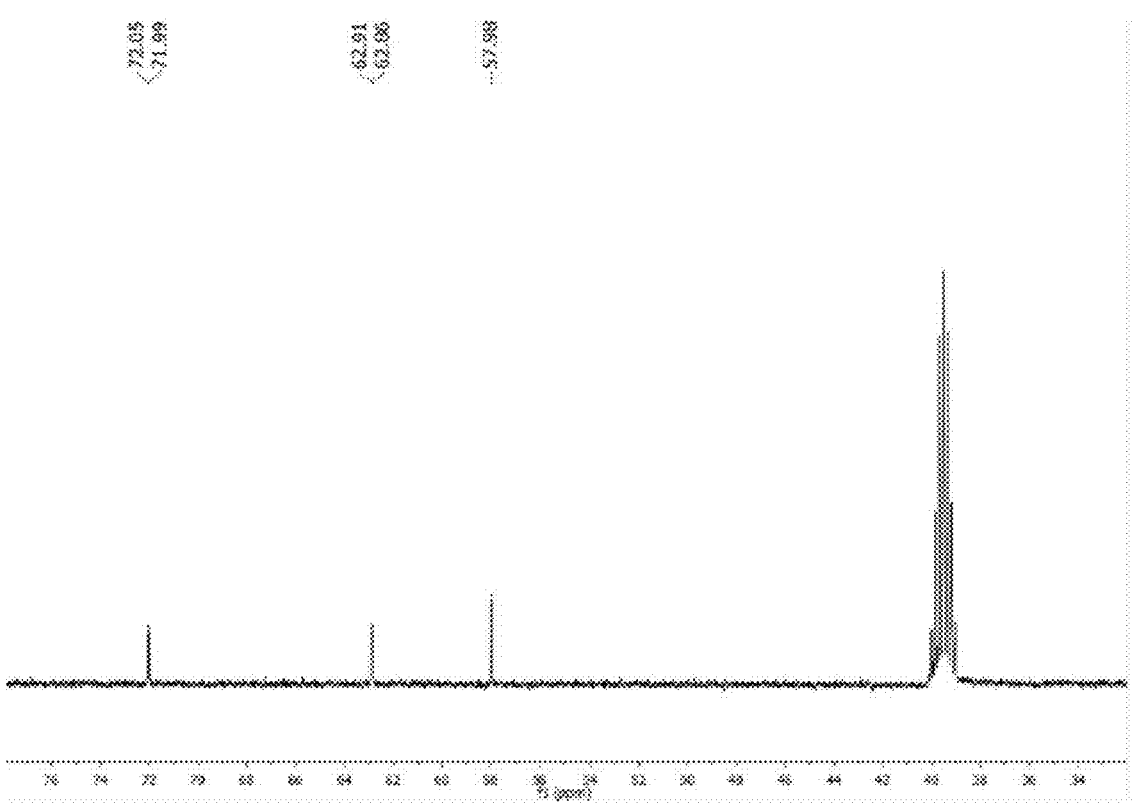
FIG. 18 depicts $^{13}$C{$^1$H} NMR (DMSO-d6, RT, 126 MHz) of 3
Figure 19:
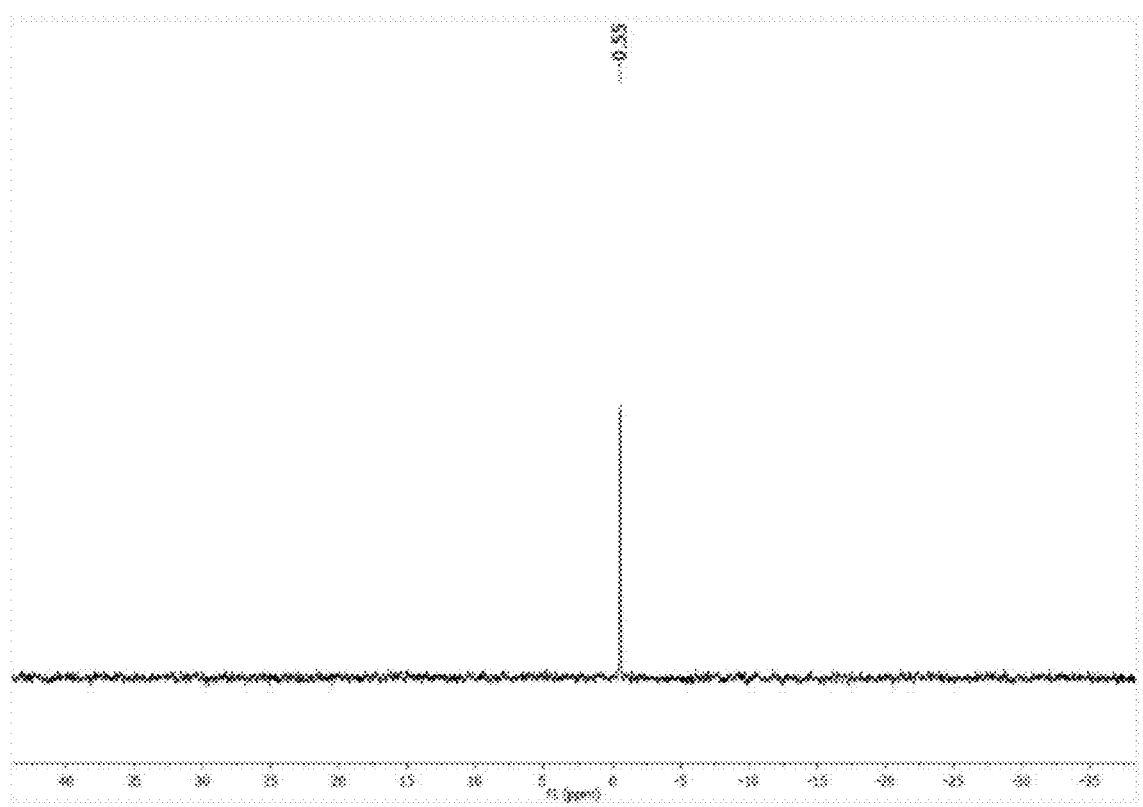
FIG. 19 depicts $^{31}P\{^{1}H\}$ NMR (DMSO-d6, RT, 203 MHz) of 3.

In a glovebox, a Schlenk flask was charged with tris(2-methoxyethyl) phosphate (OP(OCH$_2$CH$_2$OMe)$_3$) (897.8 mg, 3.298 mmol) and ca. 5 mL THF. To the vial, lithium bis(trimethylsilyl)amide (LiHMDS) (567.8 mg, 3.39 mmol) was added as a solid. The flask was sealed and heated at 70° C. for 96 h. All volatiles were removed under reduced pressure to give red oil. The resulting liquid was dissolved in THF (1 mL). To the solution, ether (20 mL) was added to precipitate out the product. The yellow solid was washed with 5 mL ether and dried under vacuum to give an off-white solid (348.0 mg, 47%). $^1$H NMR (500 MHz, DMSO-d6): FIG. 17, δ 3.69 (q, 4), 3.40 (t, 4), 3.24 (s, 6). $^{13}$C NMR (126 MHz, DMSO-d6): FIG. 18, δ 72.03, 62.88, 57.98. $^{31}$P NMR (121 MHz, DMSO-d6): FIG. 19, δ−0.55. Anal. Calcd. for 3 (C$_6$H$_{14}$LiO$_6$P): C, 32.74; H, 6.41; N, 0.00. Found: C, 32.77; H, 6.71; N, <0.02.

Figure 20:
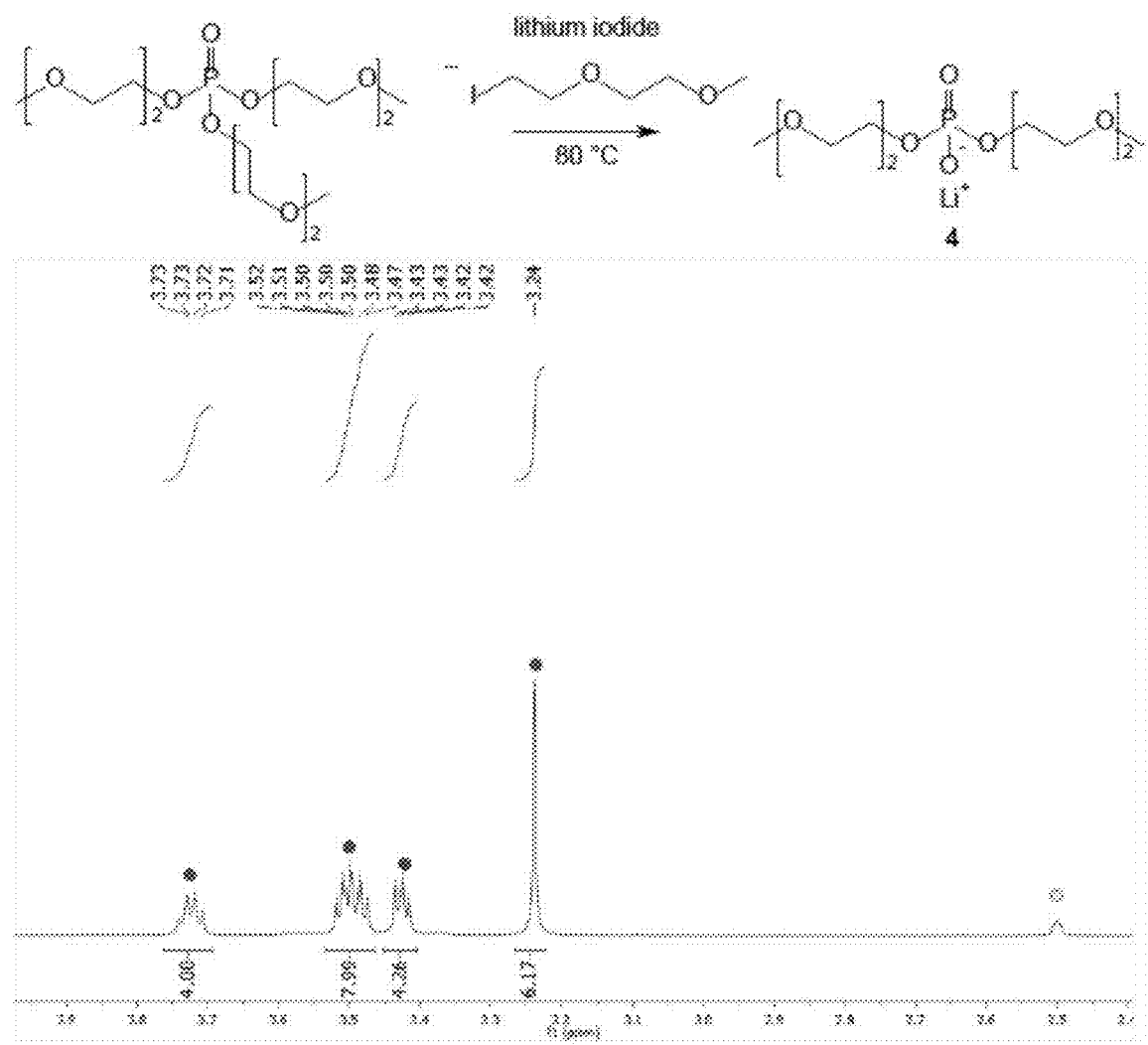
FIG. 20 depicts $^{1}H$ NMR (DMSO-d6, RT, 500 MHz) of 4. DMSO solvent peak is indicated by a yellow circle, bis(2-methoxyethoxyethyl)phosphate by blue circles.
Figure 21:
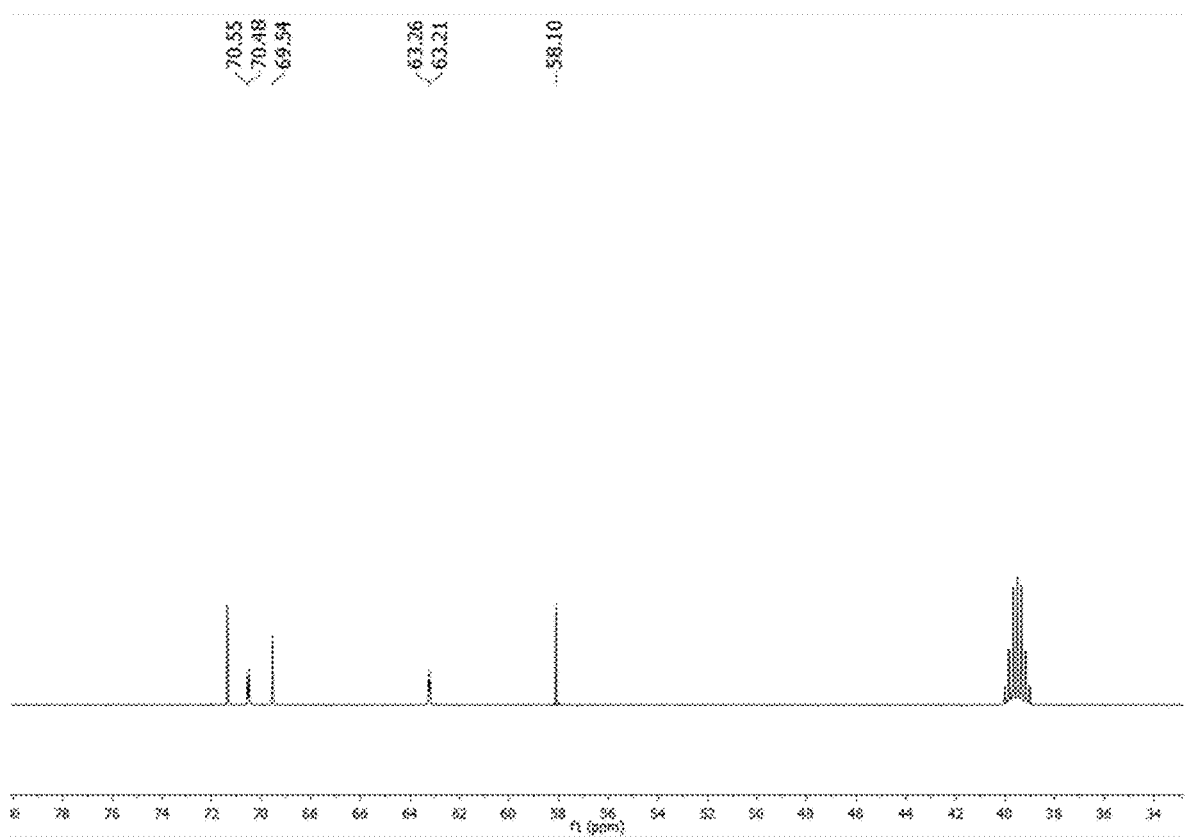
FIG. 21 depicts $^{13}C\{^{1}H\}$ NMR (DMSO-d6, RT, 126 MHz) of 4.
Figure 22:
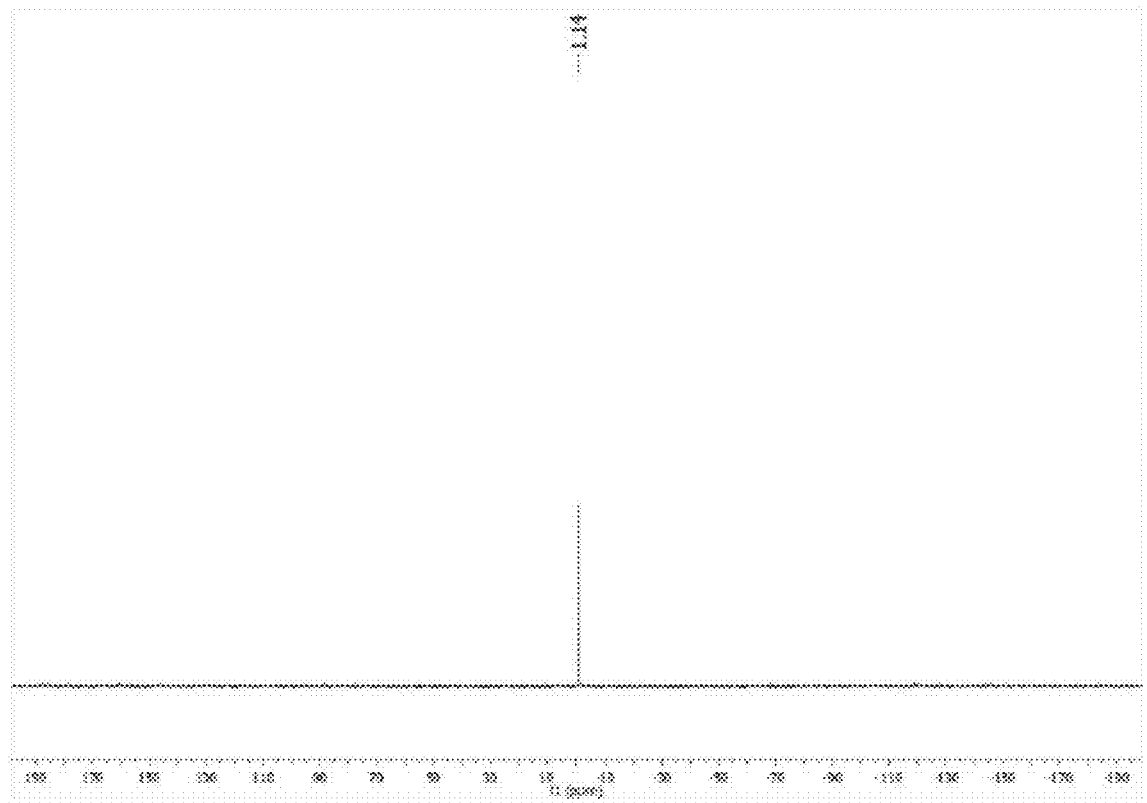
FIG. 22 depicts $^{31}P\{^{1}H\}$ NMR (DMSO-d6, RT, 203 MHz) of 4.

In a glovebox, a Schlenk flask was charged with tris(2-methoxyethoxyethyl) phosphate (OP(OCH$_2$CH$_2$OCH$_2$CH$_2$OMe)$_3$) (20.5, 50.6 mmol) and lithium iodide (LiI) (6.77 mg, 50.6 mmol, 1 eq). The flask was sealed and heated at 80° C. for 48 h. The resulting red oil was dissolved in THF (400 mL) and passed through charcoal to give a colorless solution. All volatiles were removed under reduced pressure to afford a colorless oil. The oil was washed with hexane (50 mL) three times and dried under vacuum to yield an off-white solid (13.3 g, 43.1 mmol, 85%). $^1$H NMR (500 MHz, DMSO-d6): FIG. 20, δ 3.72 (q, 4), 3.50 (m, 8), 3.42 (t, 4), 3.24 (t, 6). $^{13}$C{$^1$H} NMR (126 MHz, DMSO-d6): FIG. 21, δ 71.35, 70.52, 69.54, 63.24, 58.10. $^{31}$P{$^1$H}NMR (121 MHz, DMSO-d6): FIG. 22, δ−1.14. Anal. Calcd. for 4 (C$_{10}$H$_{22}$LiO$_8$P): C, 38.97; H, 7.20; N, 0.00. Found: C, 39.22; H, 7.17; N, <0.02.

Figure 23:
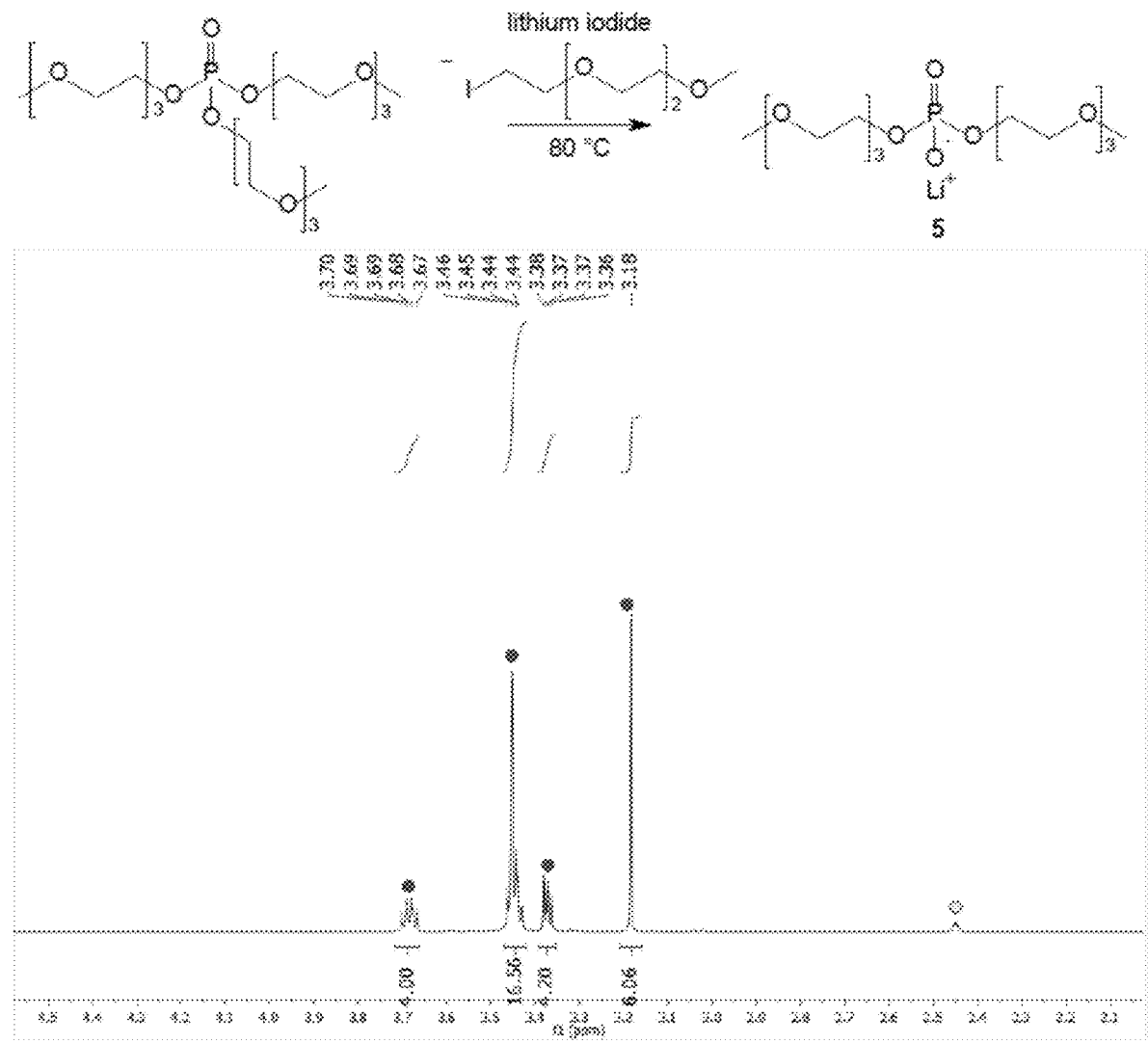
FIG. 23 depicts $^{1}H$ NMR (DMSO-d6, RT, 500 MHz) of 5. DMSO solvent peak is indicated by a yellow circle, bis(2-methoxyethoxyethyl)phosphate by blue circles
Figure 24:
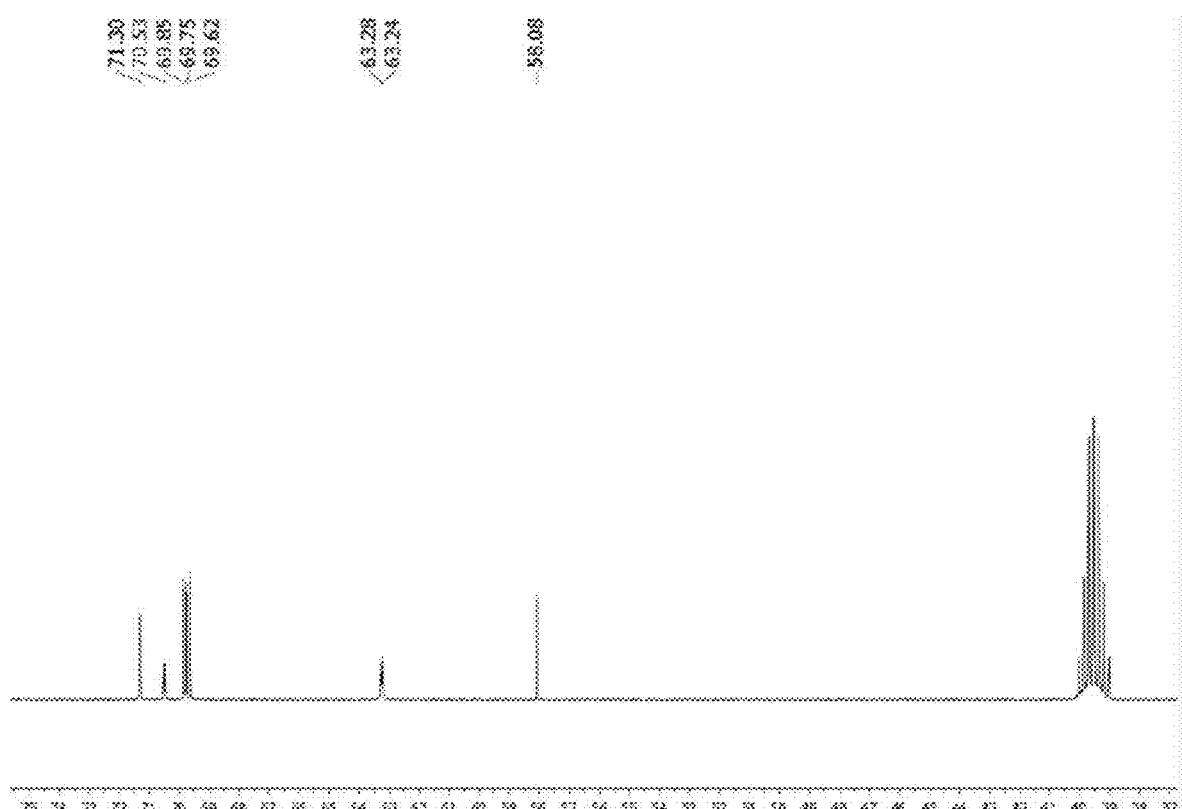
FIG. 24 depicts $^{13}C\{^{1}H\}$ NMR (DMSO-d6, RT, 126 MHz) of 5.
Figure 25:
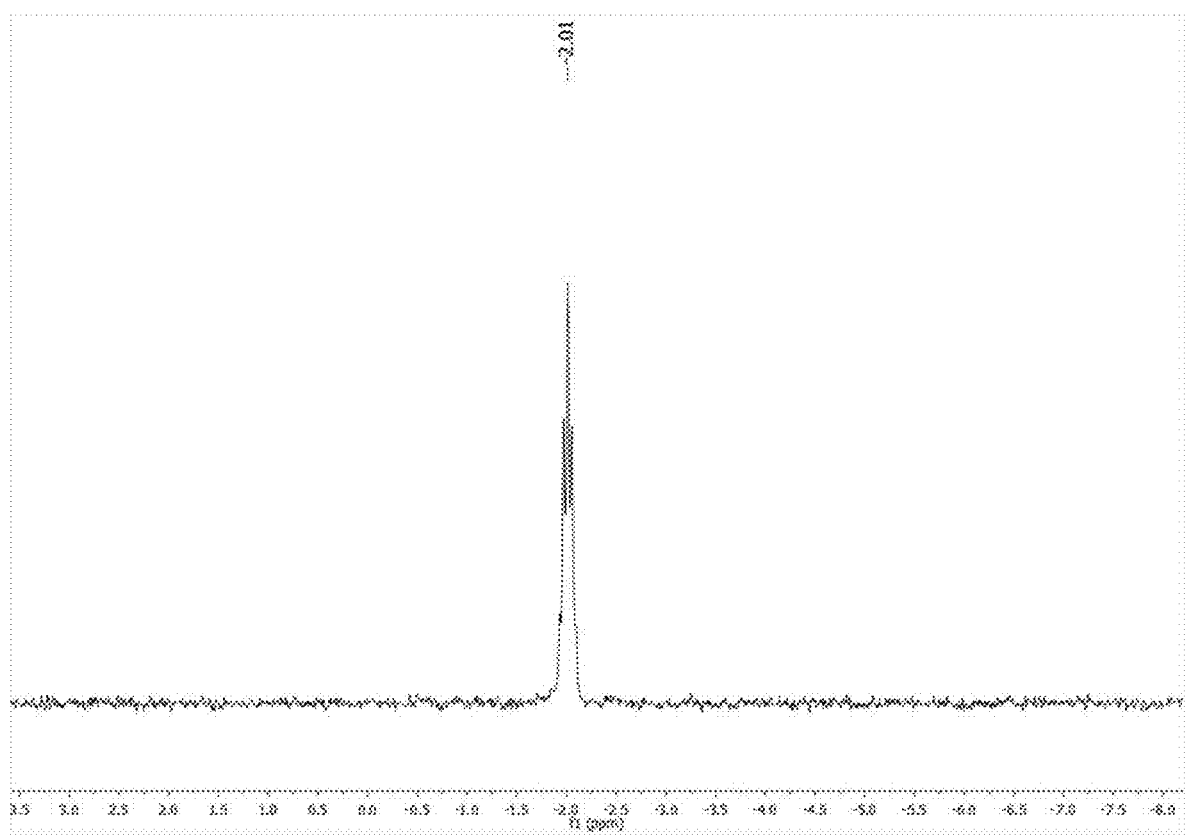
FIG. 25 depicts 0.31P NMR (DMSO-d6, RT, 203 MHz) of 5.

In a glovebox, a Schlenk flask was charged with tris(2-methoxyethoxyethoxyethyl) phosphate (OP(OCH$_2$CH$_2$OCH$_2$CH$_2$OCH$_2$CH$_2$OMe)$_3$) (28.1 g, 52.4 mmol) and lithium iodide (Li) (6.99 g, 52.2 mmol, 1 eq). The flask was sealed and heated at 80° C. for 48 h. The resulting red oil was dissolved in THF (400 mL) and passed through charcoal to give a colorless solution. All volatiles were removed under reduced pressure to afford a colorless oil. The oil was washed with hexane (50 mL) three times and dried under vacuum to yield an off-white solid (17.70 g, 44.7 mmol, 86%). $^1$H NMR (500 MHz, DMSO-d6): FIG. 23, δ 3.72 (q, 4), 3.51 (m, 16), 3.42 (m, 4), 3.24 (s, 6). $^{13}$C{$^1$H} NMR (126 MHz, DMSO-d6): FIG. 24, δ 71.30, 70.53, 69.85, 69.75, 66.62, 63.26, 58.08. $^{31}$P NMR (121 MHz, DMSO-d6): FIG. 25, δ−2.01. Anal. Calcd. for 5 (C$_{14}$H$_{30}$LiO$_{10}$P): C, 42.43; H, 7.63; N, 0.00. Found: C, 43.14; H, 7.63; N, <0.02.

Figure 26:
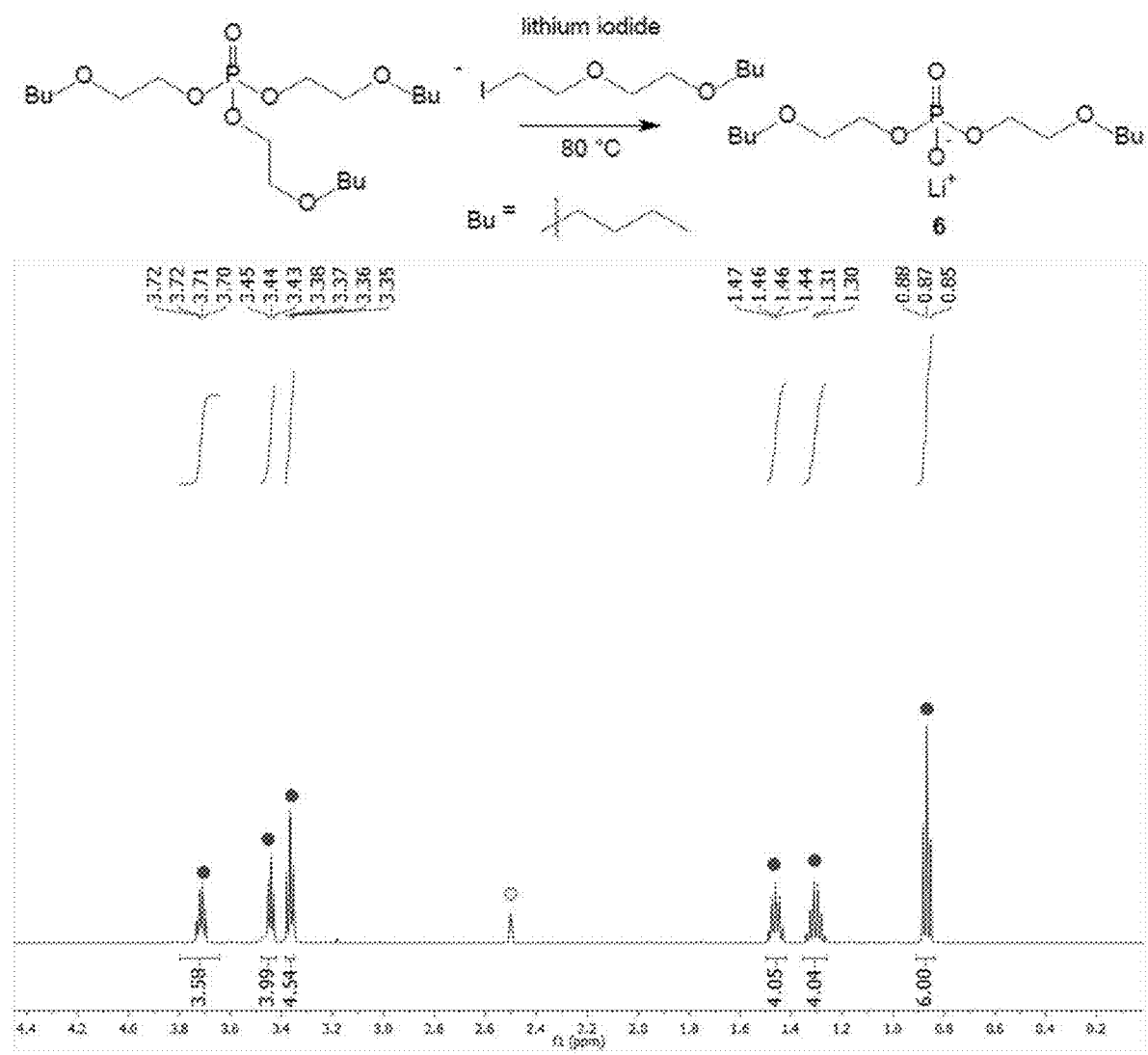
FIG. 26 depicts 1H NMR (DMSO-d6, RT, 500 MHz) of 6. DMSO solvent peak is indicated by a yellow circle, bis(2-butoxyethyl)phosphate by blue circles
Figure 27:
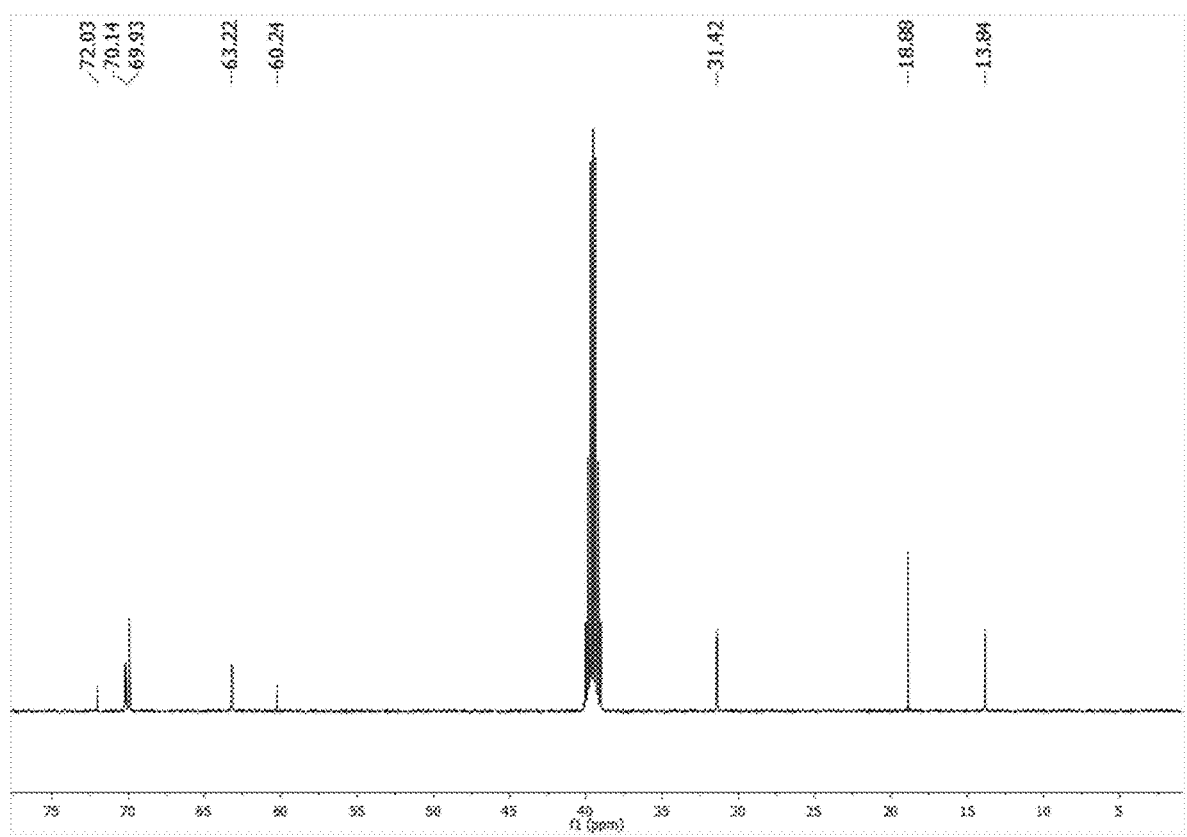
FIG. 27 depicts 13C{1H} NMR (DMSO-d6, RT, 126 MHz) of 6.
Figure 28:
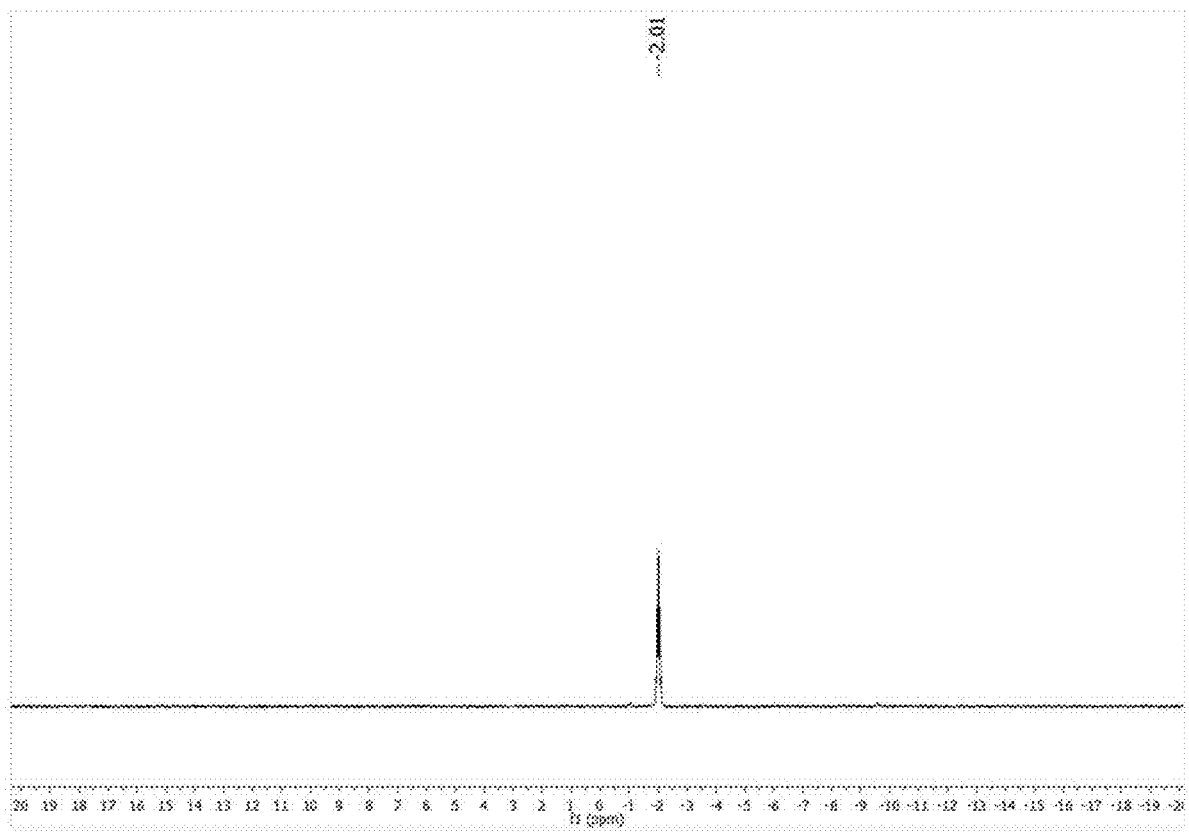
FIG. 28 depicts 31P NMR (DMSO-d6, RT, 203 MHz) of 6

In a glovebox, a Schlenk flask was charged with tris(2-butoxyethyl) phosphate (OP(OCH$_2$CH$_2$OBu)$_3$) (17.5 g, 43.9 mmol) and lithium iodide (LiI) (5.88 mg, 43.9 mmol, 1 eq). The flask was sealed and heated at 80° C. for 48 h. The resulting red oil was dissolved in THF (400 mL) and passed through charcoal to give a colorless solution. All volatiles were removed under reduced pressure to afford a colorless oil. The oil was washed with hexane (50 mL) three times and dried under vacuum to yield an off-white solid (14.0 g, 35.6 mmol, 81%). $^1$H NMR (500 MHz, DMSO-d6): FIG. 26, δ 3.71 (q, 4), 3.44 (t, 4), 3.37 (t, 4), 1.46 (m, 4), 1.30 (m, 4), 0.87 (t, 6). $^{13}$C NMR (126 MHz, DMSO-d6): FIG. 27, δ 72.03, 70.14, 69.93, 63.22, 60.24, 31.42, 18.88, 13.84. $^{31}$P NMR (121 MHz, DMSO-d6): FIG. 28, δ−2.01.

Figure 31:
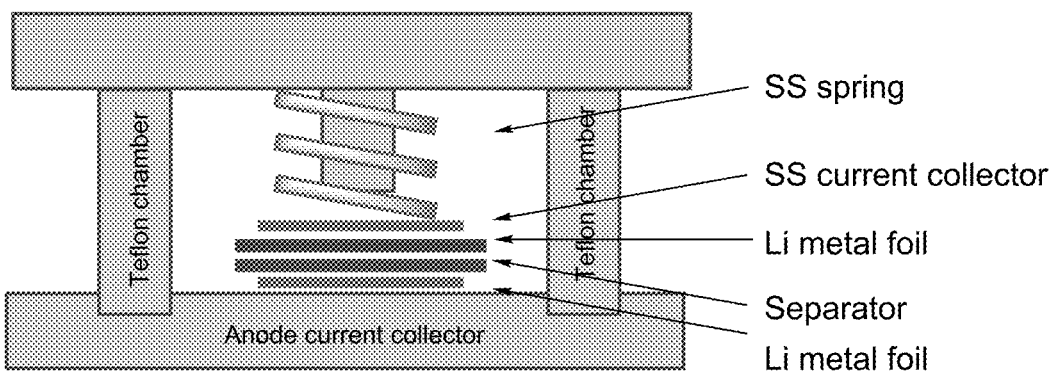
FIG. 31 depicts a prototype configuration for Li/Li symmetrical cell.
Figure 32:
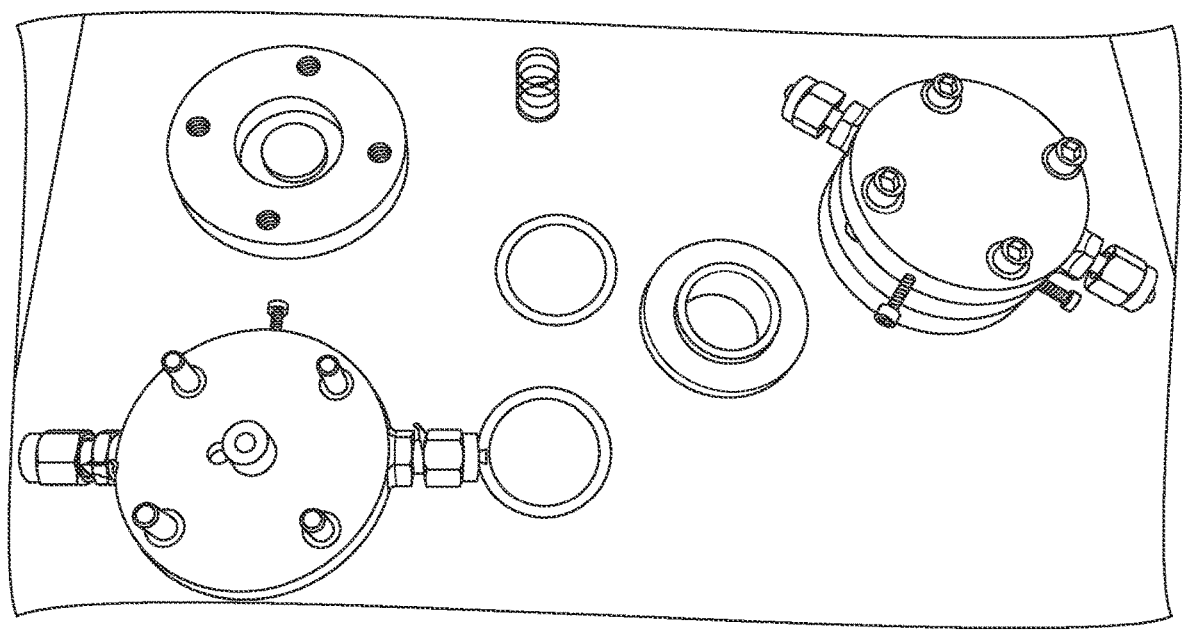
FIG. 32 depicts a digital picture image of prototype cell.
Figure 33A:
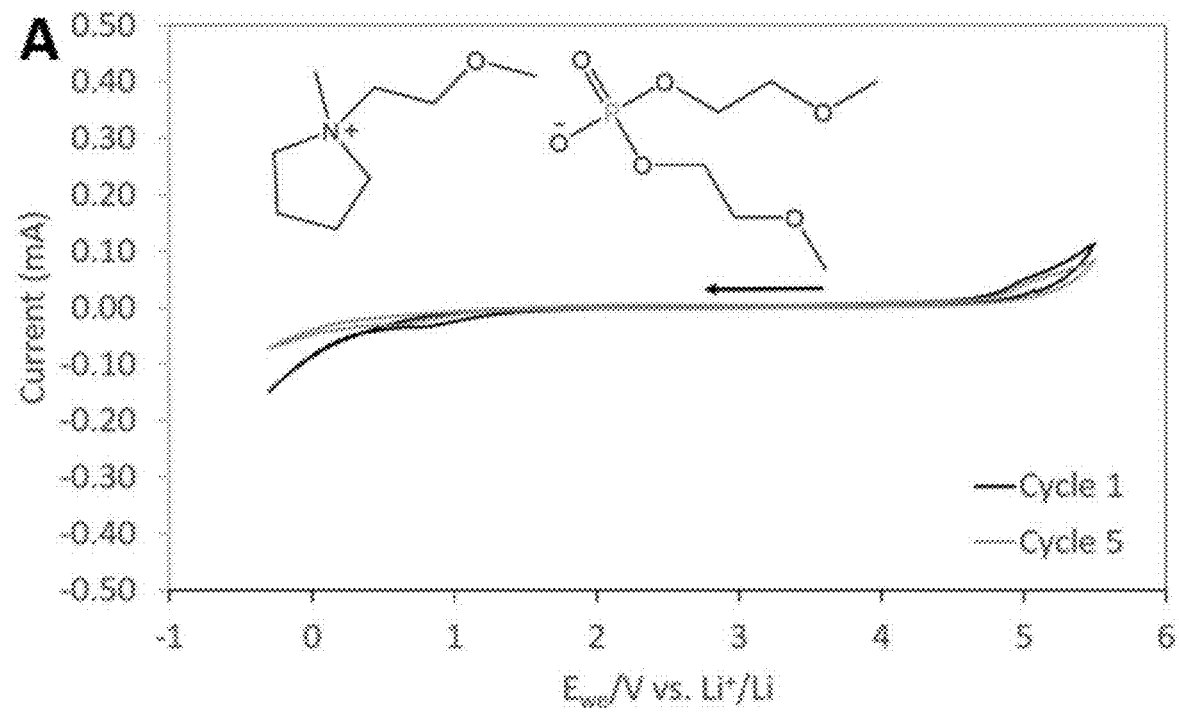
FIG. 33A depicts cyclic voltammetry of electrolyte made from [PYR$_1$ME][O$_2$P(OME)$_2$](1) and LiTFSI (0.1M) at 23° C.; the cell configuration for cyclic voltammetry measurement can be found in FIG. 31: separator: Whatman GF/A glassy microfiber, working electrode: SUS mesh, reference electrode: Li metal, counter electrode: Li metal, scan rate: 1 mV/s.
Figure 33B:
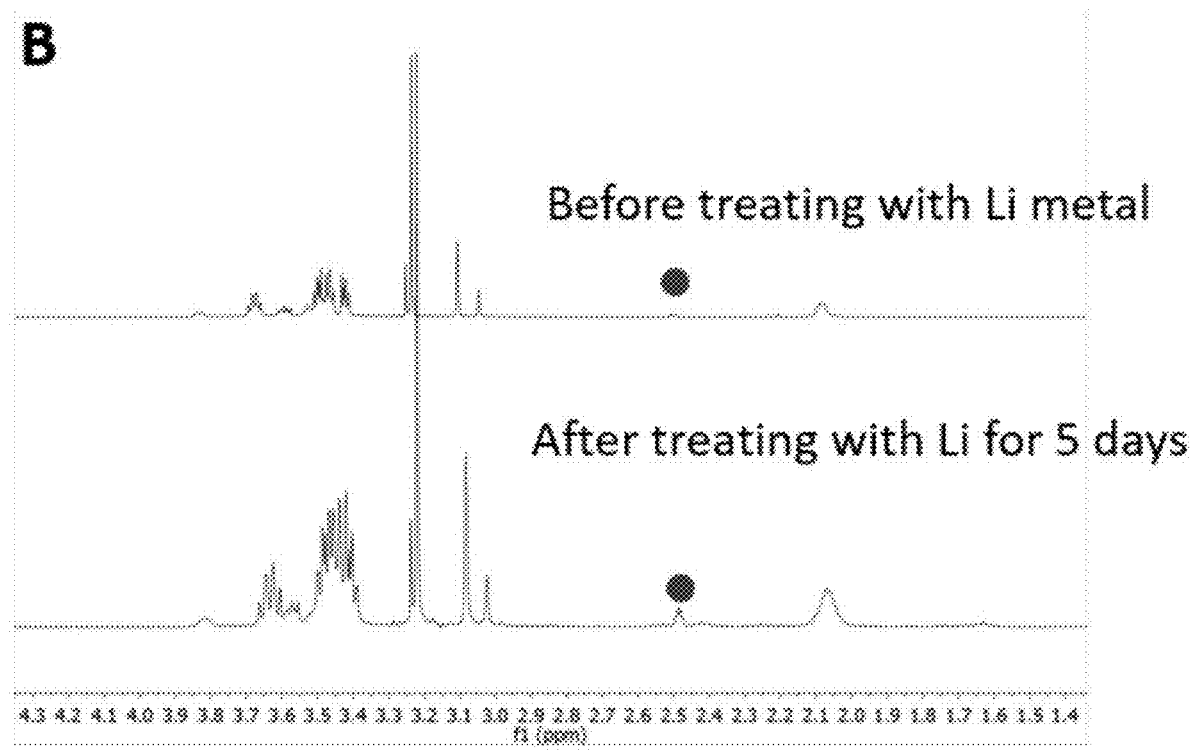
FIG. 33B depicts $^{1}H$ NMR of 1 before (DMSO, 500 MHz, 23° C.) and after (DMSO, 300 MHz, 23° C.) treatment with fresh Li metal under Ar for 120 hours, no reaction between 1 and Li metal was observed. DMSO solvent peaks are indicated by blue circles.

FIG. 33A shows cyclic voltammetry of electrolyte made from [PYR$_1$ME][O$_2$P(OME)$_2$](1) and LiTFSI (0.1M) at 23° C.; the cell configuration for cyclic voltammetry measurement can be found in FIG. 31: separator: Whatman GF/A glassy microfiber, working electrode: SUS mesh, reference electrode: Li metal, counter electrode: Li metal, scan rate: 1 mV/s. FIG. 33B shows $^1$H NMR of 1 before (DMSO, 500 MHz, 23° C.) and after (DMSO, 300 MHz, 23° C.) treatment with fresh Li metal under Ar for 120 hours, no reaction between 1 and Li metal was observed. DMSO solvent peaks are indicated by blue circles.

Each of the references cited herein is incorporated by reference in its entirety.

Other embodiments are within the scope of the following claims.

What is claimed is:

1. A compound of formula

AB$_x$ wherein

A is Li$^+$, and

B is P(O)$_2$(OR$_5$)(OR$_6$)$^-$, each of R$_5$ and R$_6$, independently, is —(CH$_2$CH$_2$O)$_n$R$_a$, wherein each n, independently, is 1, 2 or 3, and each R$_a$, independently, is H or C1-C6 alkyl.

2. A method of preparing an ionic compound comprising:
contacting a first nucleophile with a trialkoxyphosphine oxide to form the ionic compound,
wherein the ionic compound is of formula AB$_x$ wherein A is Li$^+$, and B is P(O)$_2$(OR$_5$)(OR$_6$)$^-$, wherein each of R$_5$ and R$_6$, independently, is —(CH$_2$CH$_2$O)$_n$R$_a$, wherein each n, independently, is 1, 2 or 3, and each R$_a$, independently, is H or C1-C6 alkyl.

3. A battery comprising a housing having an anode and a cathode and an electrolyte, the electrolyte including a compound of claim 1.

4. The battery of claim 3, wherein the battery is a lithium-ion battery.

5. The compound of claim 1, wherein each n is 1.

6. The compound of claim 1, wherein each n is 2.

7. The compound of claim 1, wherein each n is 3.

8. The compound of claim 1, wherein each Ra, independently, is H.

9. The compound of claim 1, wherein each Ra, independently, is C6 alkyl.

10. The method of claim 2, wherein each n is 1.

11. The method of claim 2, wherein each n is 2.

12. The method of claim 2, wherein each n is 3.

13. The method of claim 2, wherein each Ra, independently, is H.

14. The method of claim 2, wherein each Ra, independently, is C6 alkyl.

* * * * *